(12) United States Patent
Jeong et al.

(10) Patent No.: US 11,974,041 B2
(45) Date of Patent: Apr. 30, 2024

(54) SHAPER UNIT AND IMAGE STABILIZATION DEVICE

(71) Applicant: LG INNOTEK CO., LTD., Seoul (KR)

(72) Inventors: Soo Min Jeong, Seoul (KR); Ji Sung Kim, Seoul (KR); Jun Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 212 days.

(21) Appl. No.: 17/596,574

(22) PCT Filed: Jun. 9, 2020

(86) PCT No.: PCT/KR2020/007470
§ 371 (c)(1),
(2) Date: Dec. 13, 2021

(87) PCT Pub. No.: WO2020/251243
PCT Pub. Date: Dec. 17, 2020

(65) Prior Publication Data
US 2022/0264006 A1  Aug. 18, 2022

(30) Foreign Application Priority Data
Jun. 13, 2019 (KR) .................. 10-2019-0070301
Jun. 17, 2019 (KR) .................. 10-2019-0071719

(51) Int. Cl.
*H04N 5/335* (2011.01)
*G02B 27/64* (2006.01)
*H04N 23/68* (2023.01)

(52) U.S. Cl.
CPC ......... *H04N 23/681* (2023.01); *G02B 27/646* (2013.01); *H04N 23/686* (2023.01)

(58) Field of Classification Search
CPC .................................................. G02B 27/646
See application file for complete search history.

(56) References Cited

U.S. PATENT DOCUMENTS 11,333,748 B2 * 5/2022 Shepard .................. G02B 5/20
2003/0107789 A1 * 6/2003 Hishioka .................. G02B 3/14
359/223.1

(Continued)

FOREIGN PATENT DOCUMENTS

JP         6-148576 A      5/1994
KR   10-2010-0040316 A    4/2010
(Continued)

OTHER PUBLICATIONS

International Search Report dated Aug. 27, 2020 in International Application No. PCT/KR2020/007470.

*Primary Examiner* — Gary C Vieaux
(74) *Attorney, Agent, or Firm* — Saliwanchik, Lloyd & Eisenschenk

(57) ABSTRACT

Provided are a shaper unit and an image stabilization device. A shaper unit, according to one aspect of the present invention, comprises: a shaper body formed of a transparent material; first glass disposed on one side of the shaper body; a membrane disposed on one side of the first glass; a variable prism disposed on one side of the membrane; and a second glass disposed on one side of the variable prism.

16 Claims, 22 Drawing Sheets

(56) References Cited

U.S. PATENT DOCUMENTS

| | | | |
|---|---|---|---|
| 2007/0030573 A1* | 2/2007 | Batchko | B33Y 30/00 |
| | | | 359/665 |
| 2019/0104239 A1 | 4/2019 | Aschwanden et al. | |
| 2021/0141126 A1* | 5/2021 | Craen | G02B 27/646 |
| 2021/0239999 A1* | 8/2021 | Son | H04N 23/58 |

FOREIGN PATENT DOCUMENTS

| | | |
|---|---|---|
| KR | 10-1634299 B1 | 6/2016 |
| KR | 10-2018-0041040 A | 4/2018 |

* cited by examiner

SHAPER UNIT AND IMAGE STABILIZATION DEVICE

CROSS-REFERENCE TO RELATED APPLICATIONS

This application is the U.S. national stage application of International Patent Application No. PCT/KR2020/007470, filed Jun. 9, 2020, which claims the benefit under 35 U.S.C. § 119 of Korean Application Nos. 10-2019-0070301, filed Jun. 13, 2019; and 10-2019-0071719, filed Jun. 17, 2019, the disclosures of each of which are incorporated herein by reference in their entirety.

TECHNICAL FIELD

The present invention relates to a shaper unit, an image stabilization device, and a camera module.

BACKGROUND ART

The camera module photographs a subject and stores it as an image or video, and is installed in mobile terminals such as cell phones, laptops, drones, and vehicles.

Meanwhile, portable devices such as smartphones, tablet PCs, and laptops have built-in micro camera modules, and these camera modules automatically adjust the distance between the image sensor and the lens, thereby performing autofocus (AF) function that aligns the focal length of the lens.

In addition, recent camera modules may perform zooming function of zooming up or zooming out which enables photographing of distant subjects with increased or decreased magnification through a zoom lens.

In addition, recent camera modules employ image stabilization (IS) technology to correct or inhibit image shaking due to camera movement caused by unstable fixing devices or user movement.

Such image stabilization (IS) technology is largely divided into optical image stabilization (OIS) method, electrical image stabilization (EIS) method, digital image stabilization (DIS) method, and the like.

Among them, the optical correction method is most commonly used, and the optical correction method is divided into a prism method, a lens shift method, a sensor movement method, and the like.

Since the lens shift method and the image sensor movement method additionally require a component for moving the lens or image sensor, there is a problem in that the structure inside the lens barrel becomes complicated. However, in the case of the prism method, the thickness of the lens barrel can be made thin due to structural characteristics, and thus, it is widely used in mobile terminals in which a small camera or a small camera module must be employed.

In the case of the prism method, OIS correction is performed in a way that when an optical path difference of the incident light occurs due to camera shake, the optical path conversion amount is measured and then based on the measured value the path is corrected by using the prism that exists between the refractive prism and the lens.

However, in order to correct the OIS correction accurately, it is necessary to identify the movement of the camera module and correct in both the X-axis and Y-axis directions, and in the case of the existing prism method, there is only one prism that can change the path of light, and since both the X-axis and the Y-axis have to be performed at the same time, there was a problem of low accuracy.

In other words, since the path is changed using one prism, even if the correction is to be performed on only one axis, it inevitably affects the other axis, thereby reducing the accuracy of the correction.

DETAILED DESCRIPTION OF THE INVENTION

Technical Subject

An object to be solved by the present invention is to provide a shaper unit and an image stabilization device that can reduce the size of a product.

Another object to be solved by the present invention is to provide a camera module that performs OIS correction for each separate axis using a plurality of prisms.

Technical Solution

A shaper unit according to an aspect of the present invention for achieving the above objects comprises: a shaper body formed of a transparent material; a first glass disposed on one side of the shaper body; a membrane disposed on one side of the first glass; a variable prism disposed on one side of the membrane; and a second glass disposed on one side of the variable prism.

In addition, the area of the shaper body may be larger than the area of the first glass.

In addition, a region not being overlapped with the first glass in an optical axis direction among an upper surface or a lower surface of the shaper body may be laminated with a non-transmissive material.

A shaper unit according to an aspect of the present invention for achieving the above object comprises: a shaper body including a metal part being formed with an opening, and a light transmitting part disposed on one side of the metal part; a first glass disposed on one side of the light transmitting part; a membrane disposed on one side of the first glass; a variable prism disposed on one side of the membrane; and a second glass disposed on one side of the variable prism, wherein a lower surface of the metal part is in contact with an edge region of an upper surface of the light transmitting part, and wherein the opening and the light transmitting part are being overlapped with the first glass in an optical axis direction.

In addition, the shaper body may include a protruding part protruding to one side from a region adjacent to the opening among a lower surface of the metal part, and a lower surface of the protruding part may be in contact with an edge region of an upper surface of the light transmitting part.

In addition, the variable prism may include a container and a liquid disposed inside the container.

In addition, the area of the liquid may be larger than the area of the first glass.

In addition, the area of the membrane may be larger than the area of the liquid.

An image stabilization device according to an aspect of the present invention for achieving the above object may comprise: a shaper body made of transparent material; a first glass disposed on one side of the shaper body; a membrane disposed on one side of the first glass; a variable prism disposed on one side of the membrane; a second glass disposed on one side of the variable prism; a first driving part disposed on the shaper body, and a second driving part facing the first driving part.

In addition, the area of the shaper body may be larger than the area of the first glass.

In addition, a region not being overlapped with the first glass in an optical axis direction among an upper surface or a lower surface of the shaper body may be laminated with a non-transmissive material.

An image stabilization device according to an aspect of the present invention for achieving the above object comprises: a shaper body including a metal part having an opening formed therein, and a light transmitting part disposed on one side of the metal part; a first glass disposed on one side of the light transmitting part; a membrane disposed on one side of the first glass; a variable prism disposed on one side of the membrane; a first driving part disposed on the shaper body; and a second driving part facing the first driving part, wherein a lower surface of the metal part is in contact with an edge region of an upper surface of the light transmitting part, and wherein the opening and the light transmitting part are being overlapped with the first glass in an optical axis direction.

In addition, the shaper body may include a protruding part being protruded to one side from a region adjacent to the opening among a lower surface of the metal part, wherein a lower surface of the protruding part may be in contact with an edge region of an upper surface of the light transmitting part.

In addition, the variable prism may include a container and a liquid disposed inside the container.

In addition, the area of the liquid may be larger than the area of the first glass.

In addition, the area of the membrane may be larger than the area of the liquid.

In addition, one of the first driving part and the second driving part may include a magnet, and the other one of the first driving part and the second driving part may include a coil.

In addition, the first driving part may be disposed in an edge region of the shaper body.

In addition, the first driving part may be disposed on a side surface of the shaper body.

A camera module according to an aspect of the present invention for achieving the above object may include: a sensor that detects the movement of the camera; an image sensor; a refractive prism that changes the direction of light incident from the outside; a plurality of correction prisms disposed between the image sensor and the refractive lens and performing OIS correction; and a control unit for individually controlling the plurality of prisms so that the plurality of prisms perform OIS correction for different axes based on the result detected by the sensor.

The control unit individually calculates a correction value for OIS correction for each axis of the camera module based on the result detected by the sensor, and then based on the calculated result, the plurality of correction prisms may be individually controlled for each axis of the camera module.

The control unit may perform the OIS correction by driving the correction prism based on a horizontal central axis or a vertical central axis of the correction prism.

The plurality of correction prisms may include a first prism and a second prism.

The first prism may perform OIS correction in the X-axis direction of the camera, and the second prism may perform OIS correction in the Y-axis direction of the camera.

The camera module further includes at least one lens disposed between the image sensor and the refractive lens, and the lens may be disposed between the image sensor and the plurality of correction prisms.

The lens may be disposed between the refractive prism and the plurality of correction prisms.

The plurality of correction prisms of the camera module may include a first prism and a second prism, wherein the first prism may be disposed between the refractive prism and the lens, and the second prism may be disposed between the lens and the image sensor.

The plurality of prisms include a first prism, a second prism and a third prism, wherein the first prism performs OIS correction in the X-axis direction of the camera, wherein the second prism performs OIS correction in the Y-axis direction of the camera, and wherein the third prism may perform OIS correction in the Z-axis direction of the camera.

A camera module according to another embodiment may comprise: an image sensor; a sensor that detects camera movement; a refractive prism for performing OIS correction on one axis of the camera while changing the direction of light incident from the outside; a correction prism that is disposed between the image sensor and the refractive lens for performing OIS correction on an axis different from the axis on which the prism performs OIS correction; and a control unit for individually controlling the refraction prism and the correction prism based on a result detected by the sensor.

The refraction prism may perform OIS correction in the X-axis direction of the camera, and the correction prism may perform OIS correction in the Y-axis direction of the camera.

The camera module may further include at least one lens disposed between the image sensor and the refractive lens.

The correction prism may be disposed between the image sensor and the lens.

The correction prism may be disposed between the refraction prism and the lens.

A camera module according to another embodiment may include: a sensor for detecting the movement of the camera; an image sensor; a lens capable of performing OIS correction; a refractive prism for changing the direction of light incident from the outside; a correction prism for performing OIS correction on an axis different from the axis on which the lens performs OIS correction; and a control unit for individually controlling the lens and the correction prism based on the result detected by the sensor.

The lens performs OIS correction in the X-axis direction of the camera, and the correction prism may perform OIS correction in the Y-axis direction of the camera.

The lens may include a liquid lens capable of performing OIS correction.

The correction prism and the lens may be disposed between the image sensor and the refractive prism.

The lens may be disposed in front of the image sensor, and the correction prism may be disposed in front of the lens.

The correction prism may be disposed in front of the image sensor, and the lens may be disposed in front of the correction prism.

Advantageous Effects

Through this embodiment, it is possible to provide a shaper unit and an image stabilization device capable of reducing the size of a product.

In addition, in the case of the camera module according to an embodiment, in performing OIS correction, prisms for performing OIS correction for each axis are independently disposed, so that there is an effect of more accurately performing OIS correction.

In addition, in the case of the camera module according to an embodiment, by performing OIS correction on one axis using a refractive prism or a lens capable of OIS correction, and performing OIS correction on the other axis with a correction prism, so that there is an effect of more accurately performing OIS correction.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Hereinafter, the present invention will be described in more detail with reference to the accompanying drawings.

FIGS. 1 to 12 are diagrams for explaining a shaper unit and an image stabilization device according to an embodiment of the present invention.

Figure 1:
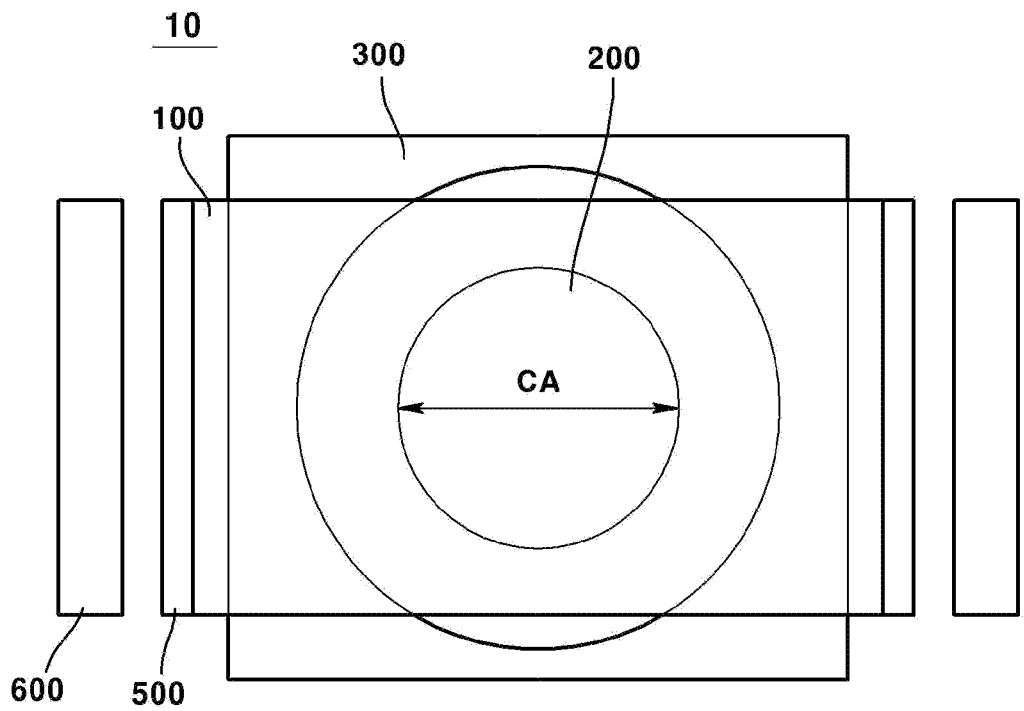
FIG. 1 is a plan view of an image stabilization device according to an embodiment of the present invention.
Figure 2:
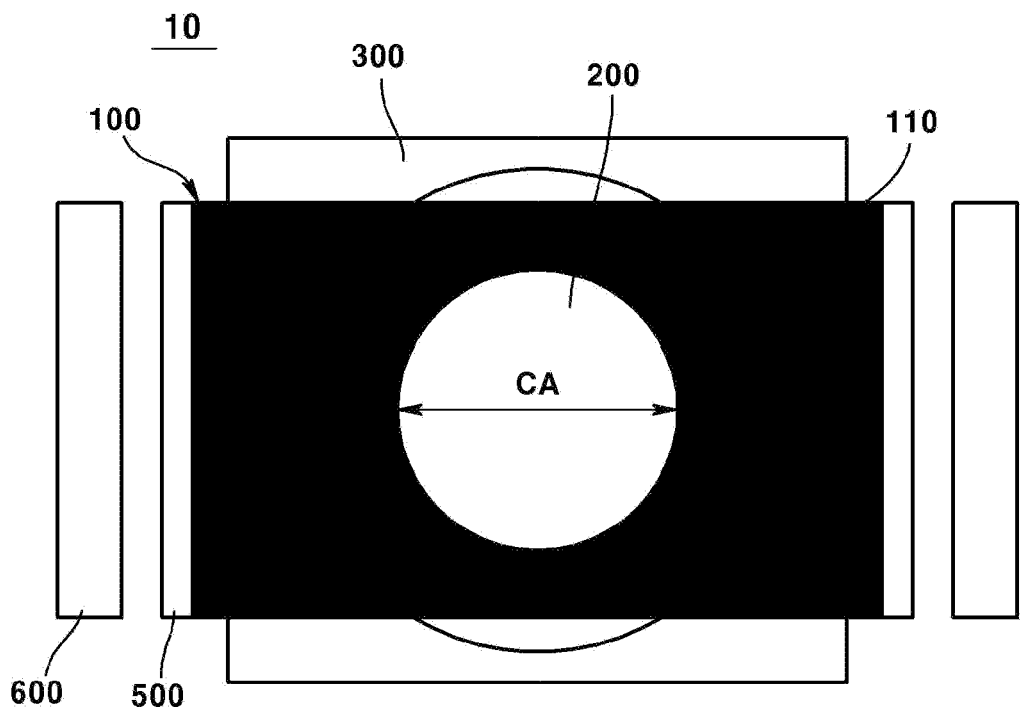
FIG. 2 is a modified embodiment of FIG. 1.
Figure 3:
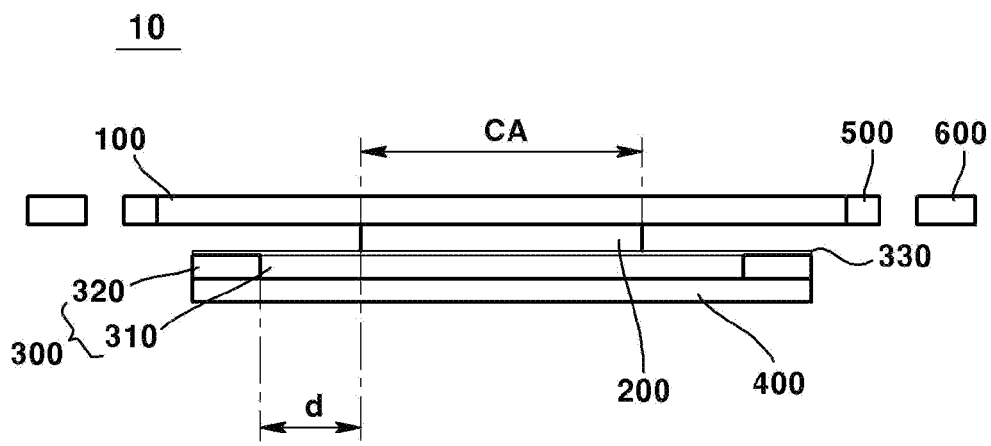
FIG. 3 is a cross-sectional view of an image stabilization device according to an embodiment of the present invention.
Figure 4:
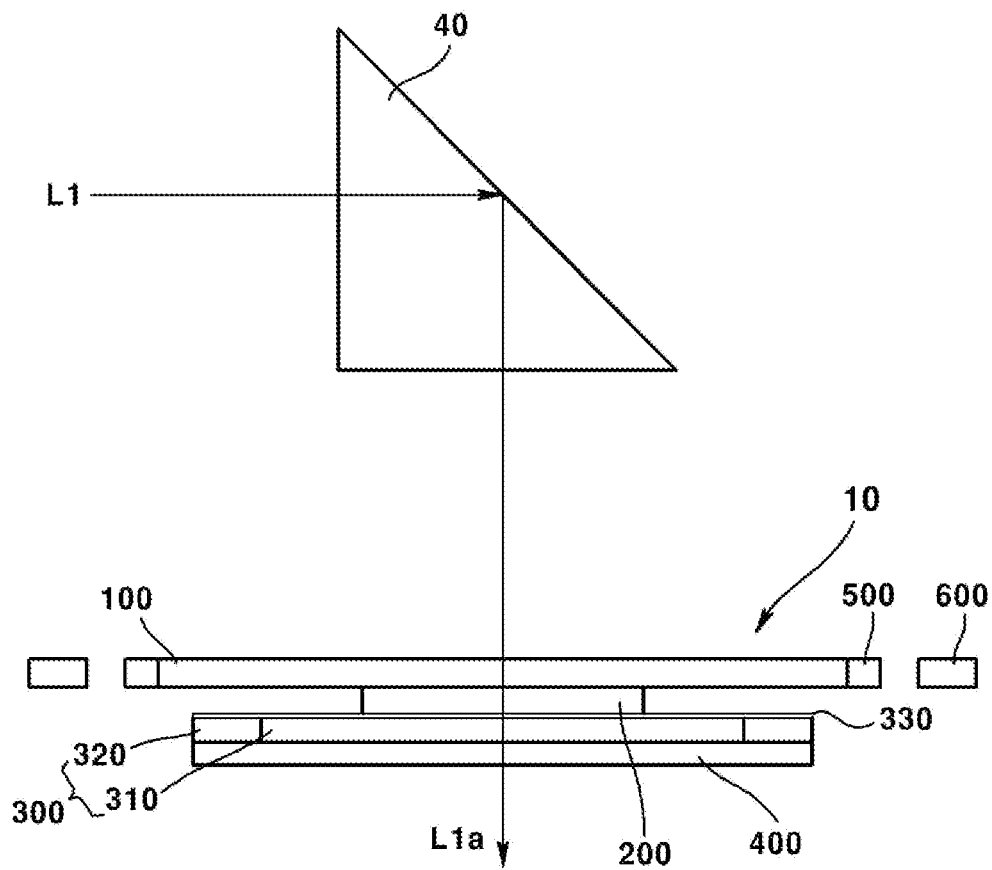
FIGS. 4 and 5 are operational diagrams of an image stabilization device according to an embodiment of the present invention.
Figure 5:
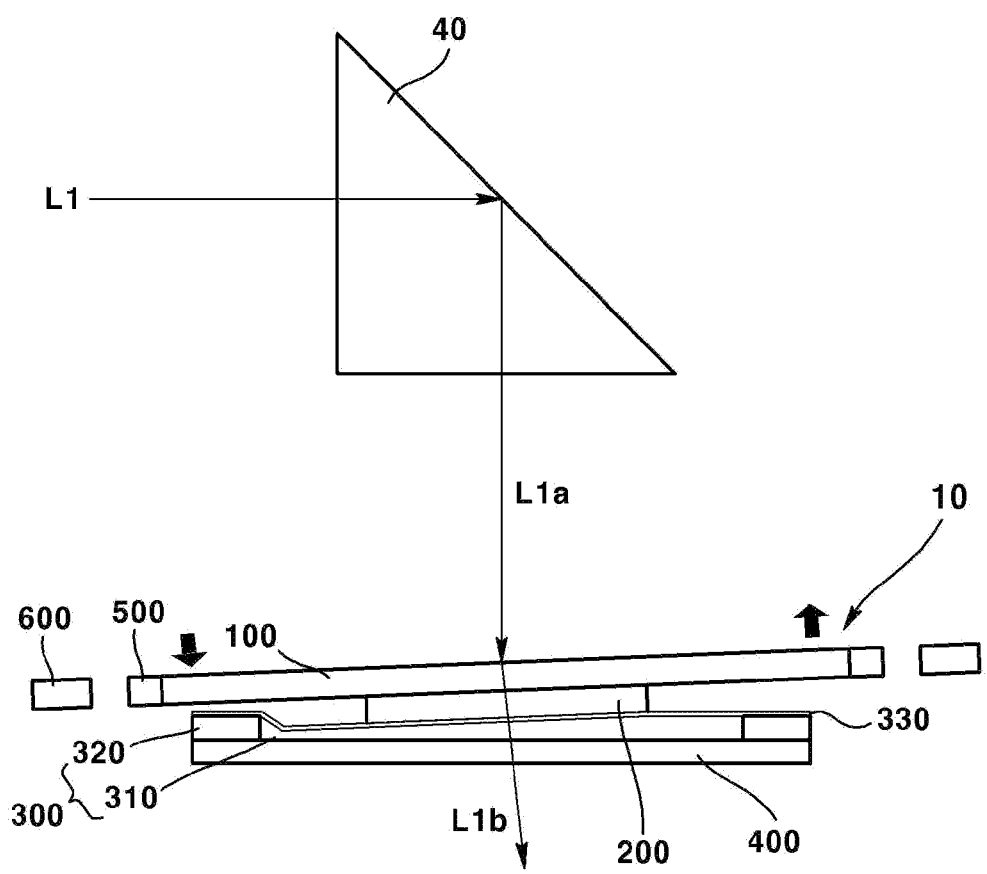

FIG. 1 is a plan view of an image stabilization device according to an embodiment of the present invention. FIG. 2 is a modified embodiment of FIG. 1. FIG. 3 is a cross-sectional view of an image stabilization device according to an embodiment of the present invention. FIGS. 4 and 5 are operational diagrams of an image stabilization device according to an embodiment of the present invention.

Referring to FIGS. 1 to 5, an image stabilization device 10 according to an embodiment of the present invention may comprise a shaper body 100, a first glass 200, a membrane 330, and a variable prism 300, a second glass 400, a first driving part 500, and a second driving part 600, but it may be implemented except for some of these configurations, and does not exclude additional configurations. Among them, the shaper body 100, the first glass 200, the membrane 330, the variable prism 300, and the second glass 400 may be referred to as a shaper unit.

The image stabilization device 10 according to an embodiment of the present invention may be included in a camera module including a zooming function. For example, the image stabilization device 10 according to an embodiment of the present invention may refer to an optical device that transmits light reflected from the fixed prism 40.

The image stabilization device 10 may include a shaper body 100. The cross-section of the shaper body 100 may be formed in a rectangular shape. In one embodiment of the present invention, the cross-section of the shaper body 100 has been described as an example formed in a rectangular shape, but the cross-sectional shape of the shaper body 100 is not limited thereto and may be variously changed.

The shaper body 100 may transmit light reflected from the fixed prism 40. The shaper body 100 may be disposed above the first glass 200. The shaper body 100 may be formed of a transparent material. For example, the shaper body 100 may be formed of a glass material. The area of the shaper body 100 may be formed to be larger than the area of the first glass 200. The shaper body 100 may be overlapped with a clear aperture (CA) of the first glass 200 in an optical axis direction or a vertical direction. A lower surface of the shaper body 100 may be bonded to an upper surface of the first glass 200 by an optical bonding method. The shaper body 100 may be integrally formed with the first glass 200. Through this, the light reflected from the fixed prism 40 may pass through the shaper body 100 made of a transparent material and be incident on the first glass 200.

The first driving part 500 may be disposed on the shaper body 100. The first driving part 500 may be disposed in the edge region of the shaper body 100. The first driving part 500 may be disposed in an edge region of an upper surface and/or a lower surface of the shaper body 100. A first driving part 500 may be disposed on a side surface of the shaper body 100. That is, when an external force is applied to the shaper body 100 through electromagnetic interaction between the first driving part 500 and the second driving part 600, the shaper body 100 can be tilted together with the first glass 200.

Referring to FIG. 2, a region not being overlapped with the first glass 200 in the optical axis or vertical direction among an upper and/or lower surface of the shaper body 100 may be laminated with the non-transmissive material 110. Among an upper and/or lower surface of the shaper body 100, regions not being overlapped with the clear aperture (CA) of the first glass 200 in the optical axis or in the vertical direction may be laminated with the non-transmissive material 110. Through this, stray light incident on the first glass 200 may be blocked.

The image stabilization device 10 may include the first glass 200. The first glass 200 may be disposed on one side or below the shaper body 100. The first glass 200 may be formed of a transparent material. For example, the first glass 200 may be glass. An upper surface of the first glass 200 may be in surface contact with a lower surface of the shaper body 100. An upper surface of the first glass 200 may be bonded to a lower surface of the shaper body 100 by an optical bonding method. The area of the first glass 200 may be smaller than the area of the shaper body 100. The entire region of the first glass 200 may be a clear aperture (CA). A portion of the first glass 200 may be a clear aperture (CA). A clear aperture (CA) of the first glass 200 may be overlapped with the shaper body 100 in an optical axis or a vertical direction. In an embodiment of the present invention, although the clear aperture (CA) has been described as having a circular shape as an example, the clear aperture (CA) may be an ellipse or may be formed in other shapes.

The first glass 200 may be disposed on the membrane 330. A lower surface of the first glass 200 may be in surface contact with an upper surface of the membrane 330. A lower surface of the first glass 200 may be bonded to an upper surface of the membrane 330 through an optical bonding method. The area of the first glass 200 may be smaller than the area of the membrane 330. Through this, when an external force is applied to the shaper body 100 through electromagnetic interaction between the first driving part 500 and the second driving part 600, the first glass 200 may be tilted with the shaper body 100 and the membrane 330.

The image stabilization device 10 may include a membrane 330. The membrane 330 may be a thin film. The membrane 330 may be disposed on one side or below the first glass 200. An upper surface of the membrane 330 may be in surface contact with a lower surface of the first glass 200. An upper surface of the membrane 330 may be bonded to a lower surface of the first glass 200 using an optical bonding method. The membrane 330 may be formed of a light-transmissive material.

The membrane 330 may be disposed above or on the other side of the variable prism 300. The membrane 330 may be in surface contact with an upper surface of the variable prism 300. A lower surface of the membrane 330 may be in contact with an upper surface of the variable prism 300 using an optical bonding method. Some regions of the membrane 330 may be in contact with the container 320 of the variable prism 300, and other regions may be in contact with the liquid 310. Through this, when an external force is applied to the shaper body 100 through electromagnetic interaction between the first driving part 500 and the second driving part 600, the membrane 330 may be tilted together with the shaper body 100 and the first glass 200.

The image stabilization device 10 may include a variable prism 300. The variable prism 300 may be disposed on one side or below the membrane 330. An upper surface of the variable prism 300 may be in surface contact with a lower surface of the membrane 330. An upper surface of the variable prism 300 may be bonded to a lower surface of the membrane 330 using an optical bonding method. In one embodiment of the present invention, as an example, the area of the variable prism 300 is described to be the same area of the membrane 330 as an example, but is not limited thereto, and the area of the variable prism 300 may be formed to be larger than the area of the membrane 330.

The variable prism 300 may include a container 320 and a liquid 310 disposed inside the container 320. The area of the liquid 310 may be larger than the area of the first glass 200. An upper surface of the liquid 310 may be in contact with a lower surface of the membrane 330. An upper portion of the liquid 310 may not be exposed to the outside due to the membrane 330. The liquid 310 may be transparent. The liquid 310 may be light-transmissive. The area of the liquid 310 may be smaller than the area of the membrane 330.

The variable prism 300 may be disposed on or above the other side of the second glass 400. A lower surface of the variable prism 300 may be in surface contact with an upper surface of the second glass 400. A lower surface of the variable prism 300 may be bonded to an upper surface of the second glass 400 using an optical bonding method. The area of the liquid 310 among the variable prisms 300 may be smaller than the area of the second glass 400. The entire area of the variable prism 300 may be formed equal to or smaller than the area of the second glass 400. A lower portion of the liquid 310 among the variable prisms 300 may not be exposed to the outside through the second glass 400. Unlike this, an additional membrane (not shown) may be disposed between a lower surface of the variable prism 300 and an upper surface of the second glass 400.

When an external force is applied to the shaper body 100 through an electromagnetic interaction between the first driving part 500 and the second driving part 600 through the variable prism 300, the shaper body 100, the first glass 200, and the membrane 330 may be tilted.

The image stabilization device 10 may include the second glass 400. The second glass 400 may be disposed on one side or below the variable prism 300. An upper surface of the second glass 400 may be in surface contact with a lower surface of the variable prism 300. An upper surface of the second glass 400 may be bonded to a lower surface of the variable prism 300 using an optical bonding method. Unlike this, an additional membrane may be disposed between the second glass 400 and the variable prism 300. The second glass 400 may be formed of a light-transmissive material. The second glass 400 may be formed of a transparent material. For example, the second glass 400 may be glass.

The image stabilization device 10 may include a first driving part 500. The first driving part 500 may be disposed in the shaper body 100. In one embodiment of the present invention, the first driving part 500 is described as being disposed on the side surface of the shaper body 100 as an example, but is not limited thereto, the first driving part 500 may be disposed on an upper surface of the shaper body 100 and/or in an edge region of a lower surface. The first driving part 500 may face the second driving part 600. When the second driving part 600 is a magnet, the first driving part 500 may be a coil. Unlike this, when the second driving part 600 is a coil, the first driving part 500 may be a magnet. The first driving part 500 may apply an external force to the shaper body 100 through electromagnetic interaction with the second driving part.

The image stabilization device 10 may include a second driving part 600. The second driving part 600 may be disposed on a fixing member (not shown) or a housing (not shown). The second driving part 600 may face the first driving part 500. When the first driving part 500 is a coil, the second driving part 600 may be a magnet. When the first driving part 500 is a magnet, the second driving part 600 may be a coil. When the first driving part 500 is a magnet and the second driving part 600 is a coil, since the second driving part 600, which is a coil, may receive current from a fixing member or another component disposed in the housing, there is an advantage of improving space efficiency.

Referring to FIG. 4, when there is no electromagnetic interaction between the first driving part 500 and the second driving part 600, a first light L1 incident from the outside is reflected by the fixed prism 40 to form an image and passes through the stabilization device 10 and is emitted as a second light L1*a*.

Referring to FIG. 5, when an external force is applied to the shaper body 100 by electromagnetic interaction between the first driving part 500 and the second driving part 600, and the shaper body 100, the first glass 200, and the membrane 330 are tilted, the second light L1*a* that is incident from the outside and reflected from the fixed prism 40 passes through the image stabilization device 10 and is emitted as a third light L1*b*.

In the image stabilization device 10 according to an embodiment of the present invention, since the shaper body 100 made of a light-transmissive material is in surface contact with an upper surface of the first glass 200, it is possible to reduce the size of the camera module by reducing the horizontal length of the shaper body 100.

Figure 6:
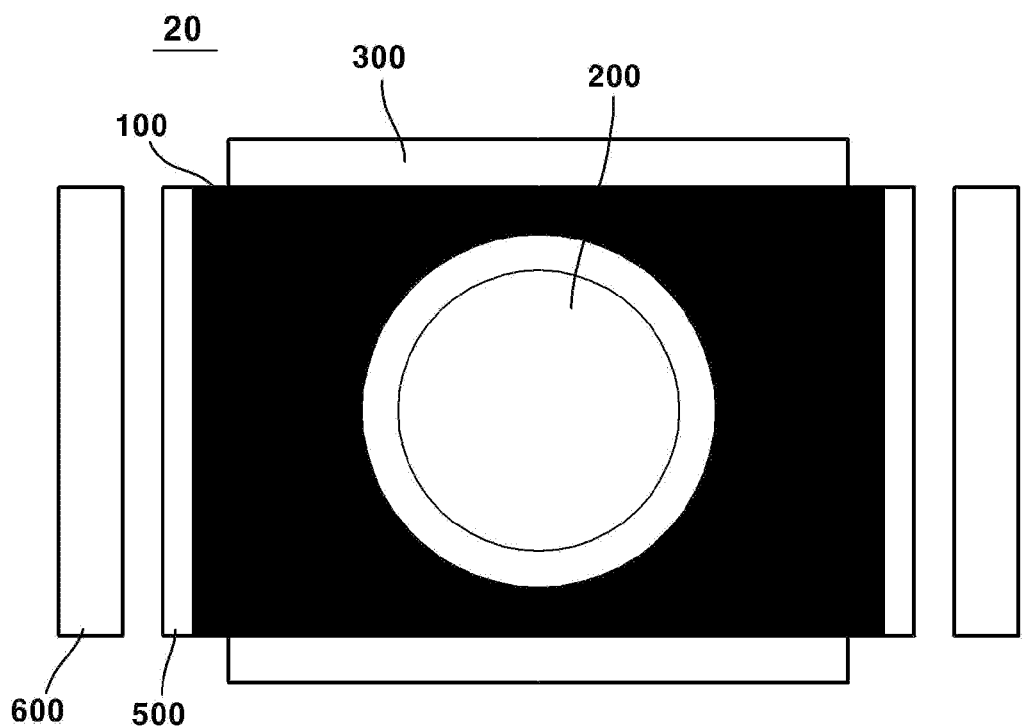
FIG. 6 is a plan view of an image stabilization device according to another embodiment of the present invention.
Figure 7:
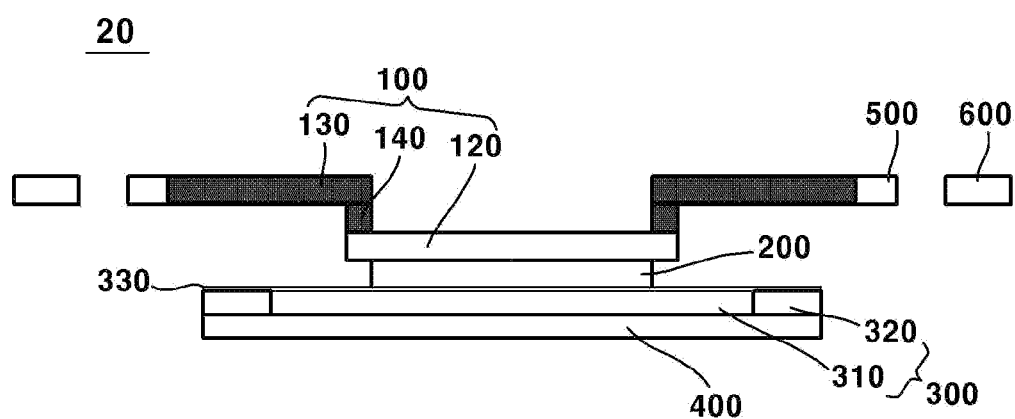
FIG. 7 is a cross-sectional view of an image stabilization device according to another embodiment of the present invention.
Figure 8:
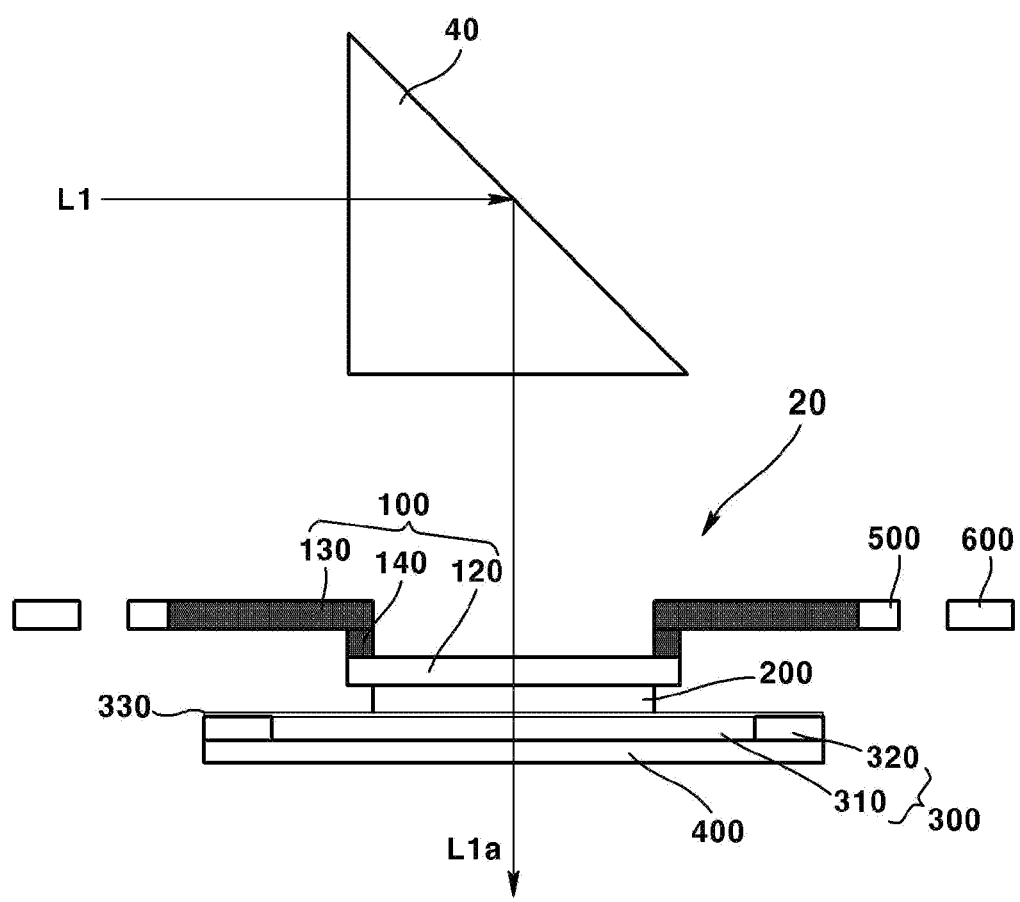
FIGS. 8 and 9 are operational diagrams of an image stabilization device according to another embodiment of the present invention.
Figure 9:
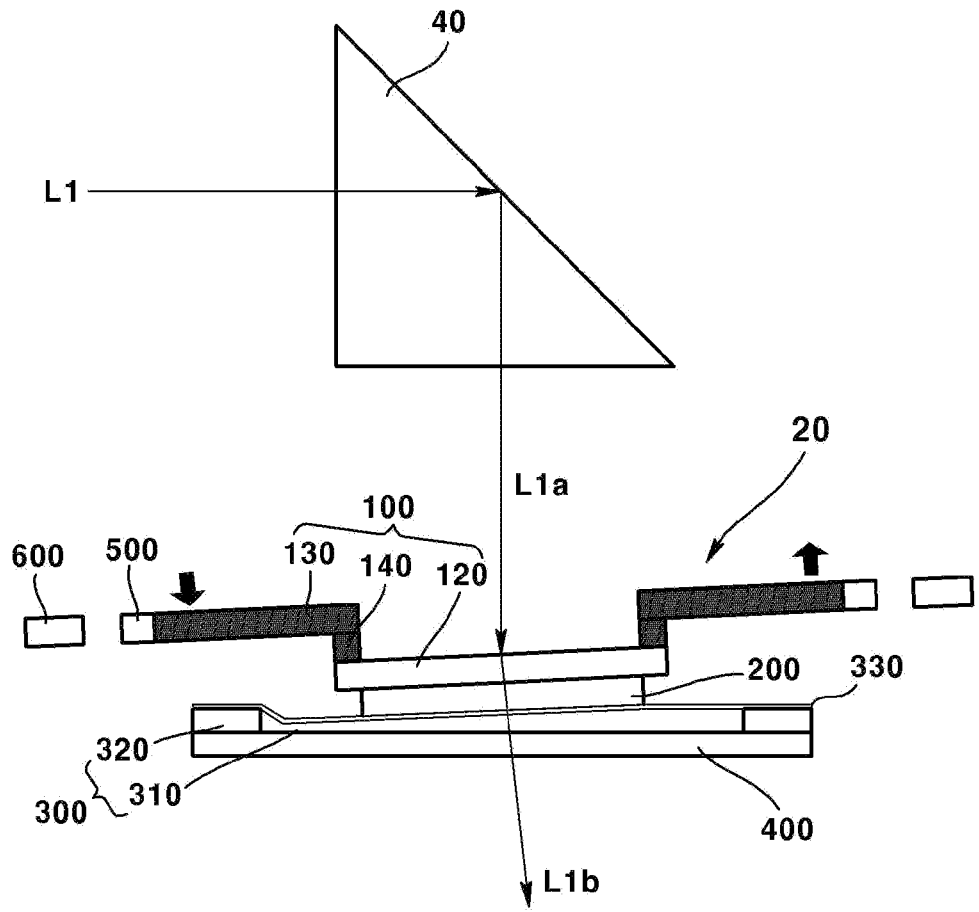

FIG. 6 is a plan view of an image stabilization device according to another embodiment of the present invention. FIG. 7 is a cross-sectional view of an image stabilization device according to another embodiment of the present invention. FIGS. 8 and 9 are operational diagrams of an image stabilization device according to another embodiment of the present invention.

Referring to FIGS. 6 to 9, the image stabilization device 20 according to another embodiment of the present invention may comprise a shaper body 100, a first glass 200, a membrane 330, a variable prism 300, a second glass 400, a first driving part 500, and a second driving part 600, but it may be implemented except for some of these configurations, and does not exclude additional configurations. Among them, the shaper body 100, the first glass 200, the membrane 330, the variable prism 300, and the second glass 400 may be referred to as a shaper unit.

Among the configurations not described hereinafter, a configuration having the same reference numerals as the image stabilization device 10 according to an embodiment of the present invention may be understood as the same configuration as the configuration of the image stabilization device 10 according to an embodiment of the present invention.

Hereinafter, a configuration different from the image stabilization device 10 according to an embodiment of the present invention will be mainly described.

The image stabilization device 20 may include a shaper body 100. The shaper body 100 may be disposed above the first glass 200. A lower surface of the shaper body 100 may be in surface contact with an upper surface of the first glass 200. A lower surface of the shaper body 100 may be bonded to an upper surface of the first glass 200 using an optical bonding method. The shaper body 100 may include a metal part 130 including an opening formed in a central region, and a light transmitting part 120 disposed on one side or below the metal part 130.

The shaper body 100 may include a light transmitting part 120. The light transmitting part 120 may be disposed above the first glass 200. A lower surface of the light transmitting part 120 may be in surface-contact with an upper surface of the first glass 200. A lower surface of the light transmitting part 120 may be bonded to an upper surface of the first glass 200 using an optical bonding method. The light transmitting part 120 may be formed of a light-transmissive material. The light transmitting part 120 may be formed of a transparent material. For example, the light transmitting part 120 may be formed of glass. The light transmitting part 120 may be integrally formed with the first glass 200. The area of the light transmitting part 120 may be formed to be larger than the area of the first glass 200. The area of the light transmitting part 120 may be formed larger than the area of a clear aperture (CA) of the first glass.

The light transmitting part 120 may be disposed on one side or below the metal part 130. The light transmitting part 120 may be overlapped with a region adjacent to the opening of the metal part 130 in an optical axis or a vertical direction. The edge region of an upper surface of the light transmitting part 120 may be in contact with a lower surface of the metal part 130. The light transmitting part 120 may be overlapped with the opening of the metal part 130 in an optical axis or a vertical direction. The area of the light transmitting part 120 may be formed larger than the area of the opening of the metal part 130. The area of the light transmitting part 120 may be formed smaller than the area of the metal part 130.

The shaper body 100 may include a metal part 130. The metal part 130 may include an opening. The opening of the metal part 130 may be overlapped with the light transmitting part 120 and the first glass 200 in an optical axis or a vertical direction. A lower surface of the region adjacent to the opening of the metal part 130 may be in surface contact with the edge region of an upper surface of the light transmitting part 120. In this case, a lower surface of the region adjacent to the opening of the metal part 130 may be bonded to the edge region of an upper surface of the light transmitting part 120 using an optical bonding method.

The metal part 130 may be formed of a metal material. The first driving part 500 may be disposed on the metal part 130. A first driving part 500 may be disposed on a side surface of the metal part 130. The first driving part 500 may be disposed in an edge region of an upper surface and/or a lower surface of the metal part 130.

According to the image stabilization device 10 according to another embodiment of the present invention, the light transmitting part 120 disposed in the center of the shaper body 10 is formed of a light-transmissive material, it is possible to inhibit damage to the first glass 200 by placing the metal part 130 in the edge region of the light transmitting part 120. In addition, since the horizontal size of the image stabilization device 10 is reduced, the size of the product can be reduced.

Figure 10:
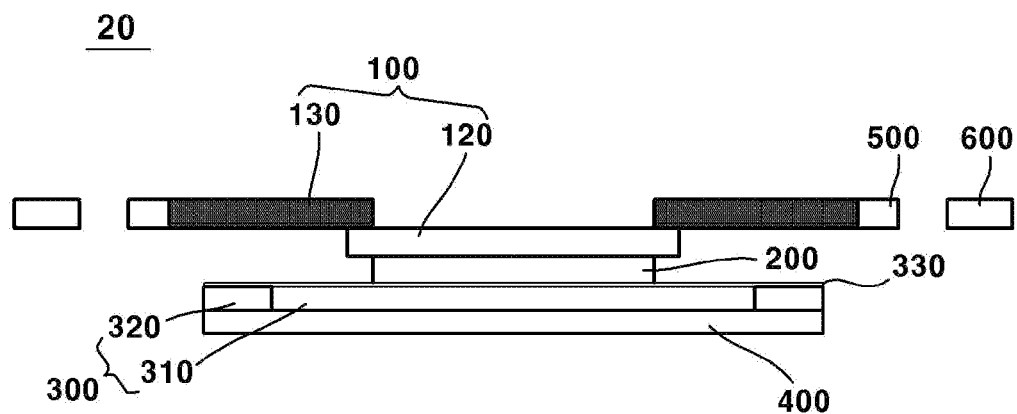
FIG. 10 is a cross-sectional view of a modified embodiment of an image stabilization device according to another embodiment of the present invention.
Figure 11:
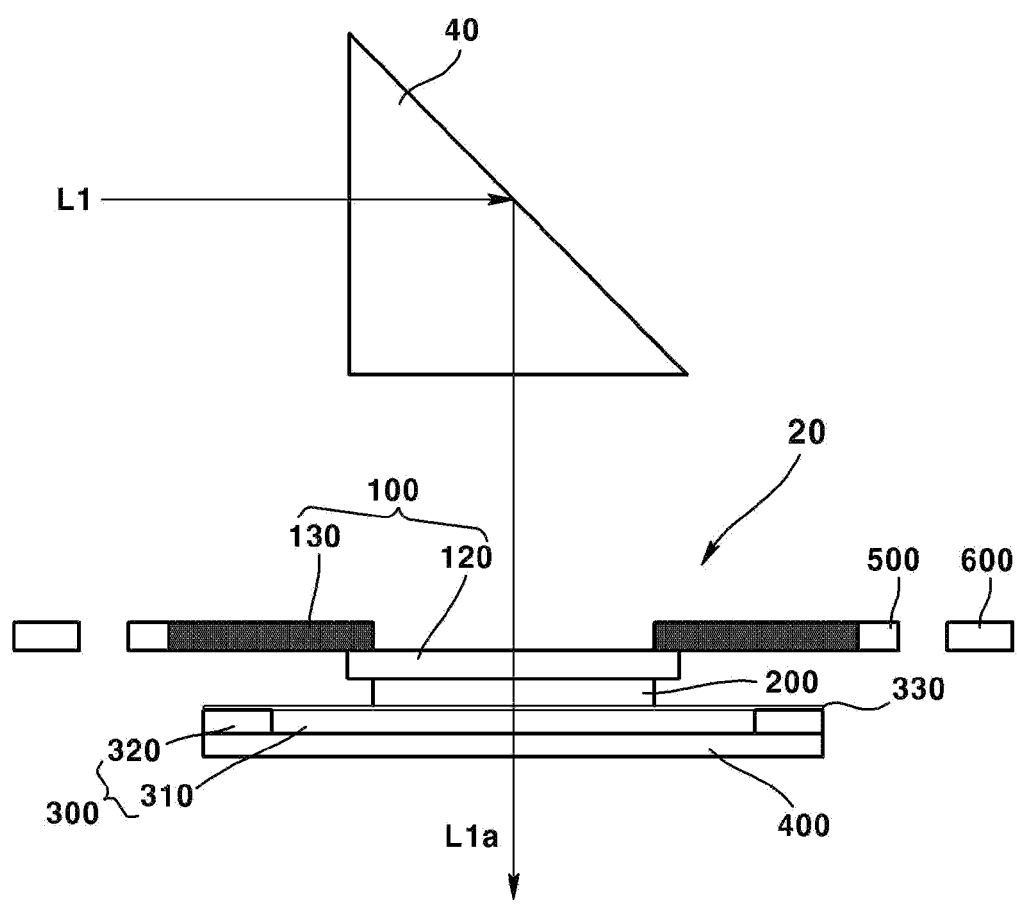
FIGS. 11 and 12 are operational diagrams of a modified embodiment of an image stabilization device according to another embodiment of the present invention.
Figure 12:
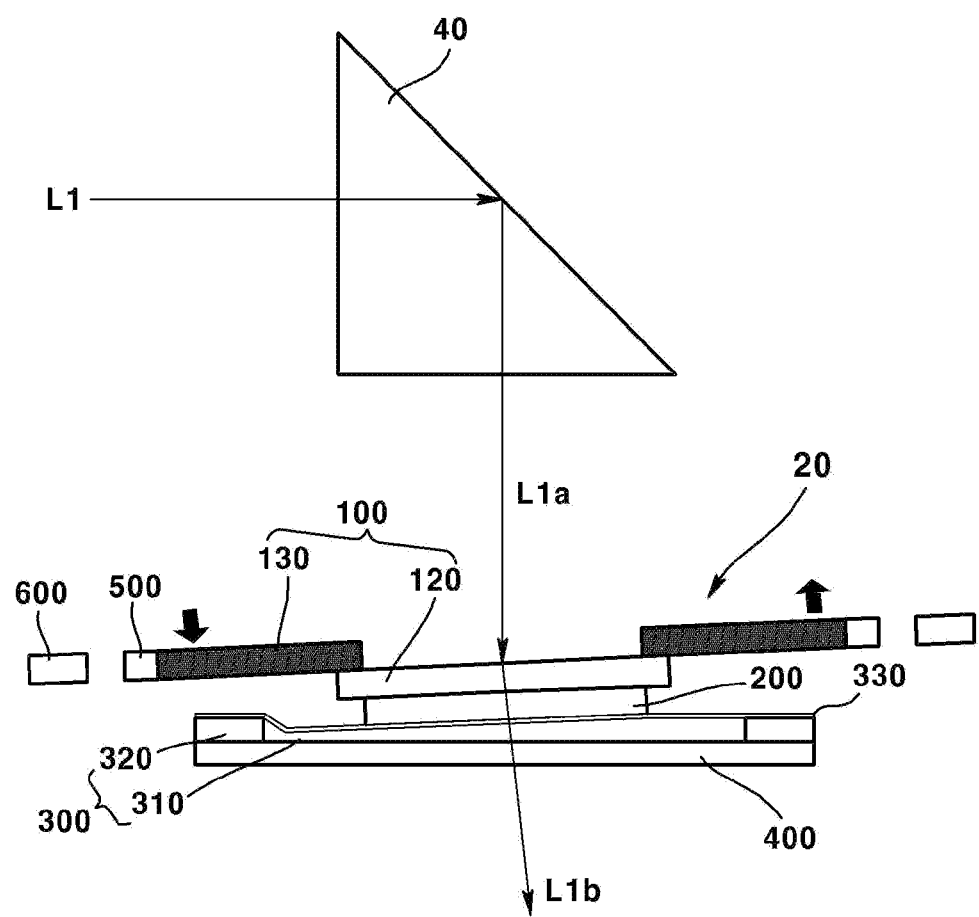

FIG. 10 is a cross-sectional view of a modified embodiment of an image stabilization device according to another embodiment of the present invention. FIGS. 11 and 12 are operational diagrams of a modified embodiment of an image stabilization device according to another embodiment of the present invention.

Referring to FIGS. 10 to 12, the shaper body 100 of the image stabilization device 20 according to another embodiment of the present invention may include a protruding part 140. The protruding part 140 may be extended one side or downward in a region adjacent to the opening of a lower surface of the metal part 130. A lower surface of the protruding part 140 may be in contact with an edge region of an upper surface of the light transmitting part 120. At this time, a lower surface of the protruding part 140 may be bonded to the edge region of an upper surface of the light transmitting part 120 using an optical bonding method. The protruding part 140 may be formed of a metal material. The protruding part 140 may be integrally formed with the metal part 130.

As described above, a shaper unit and an image stabilization device according to an embodiment of the present invention have been described with reference to FIGS. 1 to 12. Hereinafter, a camera module according to an embodiment of the present invention will be described with reference to FIGS. 13 to 26. A detailed description of a camera module according to an embodiment of the present invention to be described with reference to FIGS. 13 to 26 and a description of a shaper unit and an image stabilization device according to an embodiment of the present invention described with reference to FIGS. 1 to 12 are based on the detailed description of names, terms, and functions for each embodiment, and may be the same as or different from each other.

FIGS. 13 to 26 are diagrams for explaining a camera module according to an embodiment of the present invention.

The camera module 1000 described in the drawings below may be a "camera device", and the camera module 1000 may include a "lens driving device". The camera module 1000 may include an "AF actuator" and an "OIS actuator".

The camera module 1000 may include a printed circuit board (PCB), a lens driving device may be disposed on the printed circuit board, and the printed circuit board may be electrically connected to an image sensor.

In addition, the camera module 1000 may include an image sensor 350.

The image sensor 1350 may be disposed below the lens 1340. The image sensor 1350 may be disposed on a printed circuit board. The image sensor may be coupled to a printed circuit board by surface mounting technology (SMT).

The image sensor 1350 may convert light irradiated to the effective image region of the image sensor 1350 into an electrical signal. The image sensor 1350 may include any one of a charge coupled device (CCD), a metal oxide semi-conductor (MOS), a CPD, and a CID.

The camera module 1000 may include a lens module. The lens module may include a lens and a barrel. For example, a plurality of lenses may be laminated and coupled to the inner circumferential surface of the barrel, and the barrel to which the lenses are coupled may be coupled to the inner circumferential surface of the holder and then mounted in the housing. The lens may include a plurality of lenses.

Figure 13:
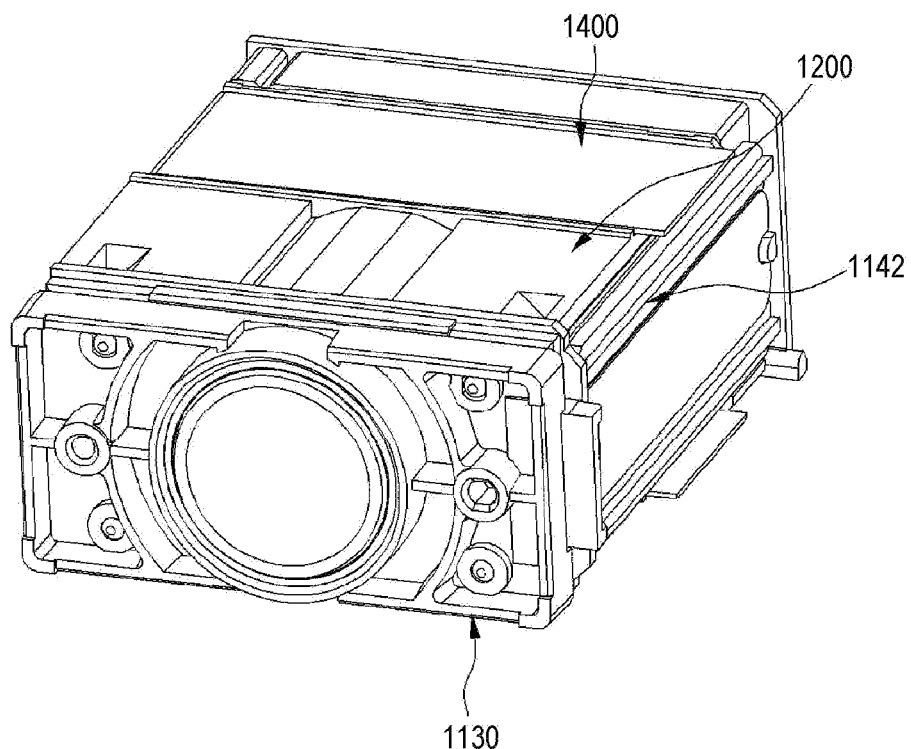
FIG. 13 is a diagram illustrating a perspective view of a camera module according to an embodiment of the present invention.
Figure 14:
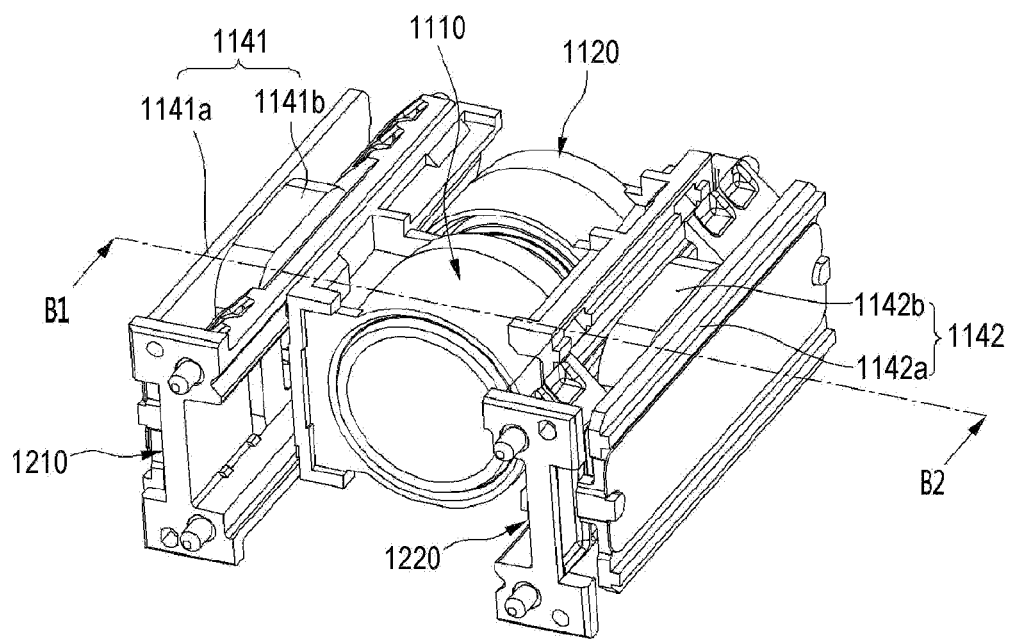
FIG. 14 is an exploded perspective view of a camera module in which some components are omitted according to an embodiment of the present invention.
Figure 15:
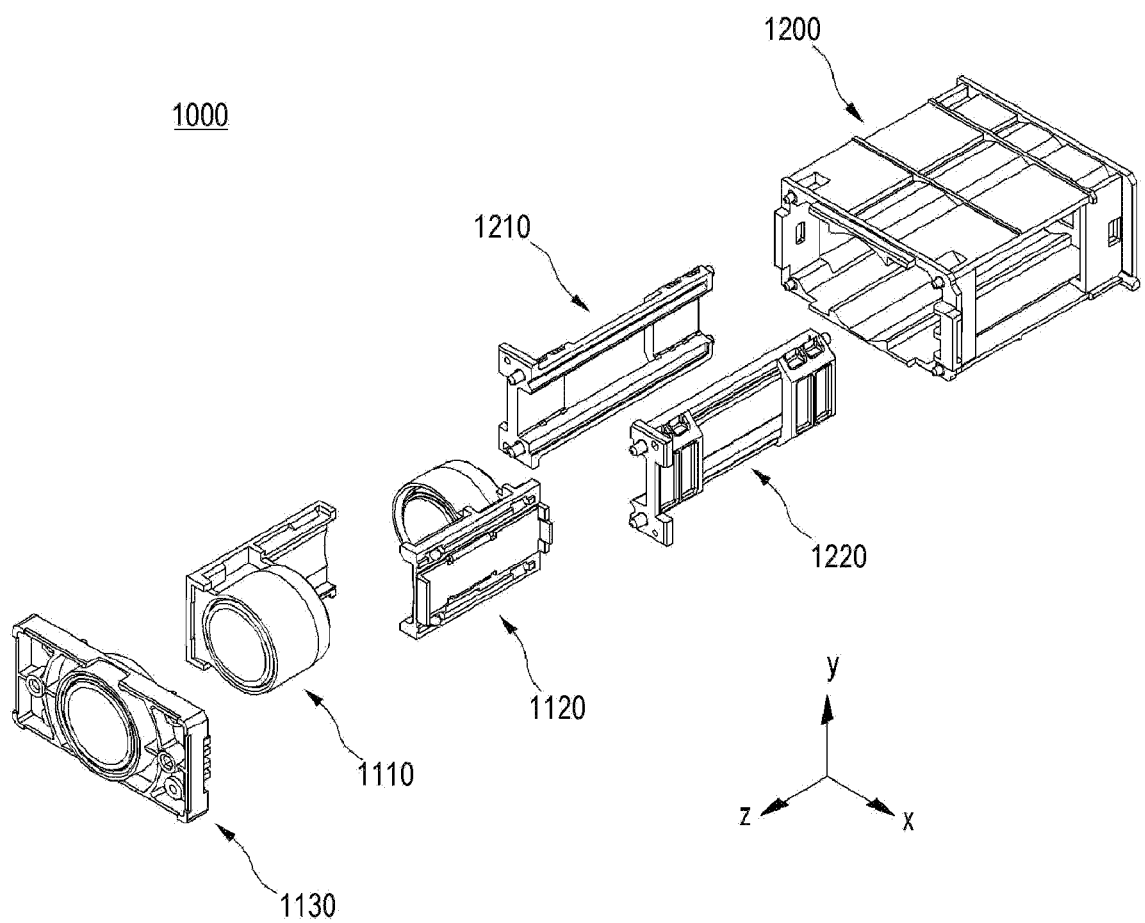
FIG. 15 is an exploded perspective view of a camera module in which some components are omitted according to an embodiment of the present invention.

FIG. 13 is a diagram illustrating a perspective view of a camera module 1000 according to an embodiment of the present invention. FIGS. 14 and 15 are exploded perspective views of the camera module 1000 in which some components are omitted, according to an embodiment.

Referring to FIGS. 13 and 14, the camera module 1000 according to an embodiment may comprise a base 1200, a circuit board 140 disposed outside the base 1200, a fourth driving part 1142, and a third lens assembly 1130.

In addition, the camera module 1000 according to an embodiment comprises a first guide part 1210, a second guide part 1220, a first lens assembly 1110, a second lens assembly 1120, a third driving part 1141, and a fourth driving part 1142. The third driving part 1141 and the fourth driving part 1142 may include a coil or a magnet.

Although not illustrated in the drawing, the lens assembly may include a lens module and a holder.

The lens module may include a lens and a barrel, and for example, a plurality of lenses may be laminated and coupled to the inner circumferential surface of the barrel, and the barrel to which the lens is coupled may be coupled to the inner circumferential surface of the holder. The holder may be a 'bobbin', and the holder may be disposed in a movable structure inside the housing.

Referring to FIG. 14, when the third driving part 1141 and the fourth driving part 1142 include coils, the third driving part 1141 may include a first coil part 1141b and a first yoke 1141a, and the fourth driving part 1142 may include a second coil part 1142b and a second yoke 1142a. Or, unlike this, the third driving part 1141 and the fourth driving part 1142 may include magnets.

In the X, Y, and Z axis direction illustrated in FIG. 15, the Z-axis means an optical axis direction or a direction parallel thereto, the X-Z plane represents the ground, and the X-axis means a direction perpendicular to the Z-axis on the ground (X-Z plane), and, the Y-axis may mean a direction perpendicular to the ground.

Referring to FIG. 15, a camera module 1000 according to an embodiment may comprise a base 1200, a first guide unit 1210, a second guide unit 1220, a first lens assembly 1110, a second lens assembly 1120, and a third lens assembly 1130.

As described in FIG. 13, each lens assembly of the first lens assembly 1110, the second lens assembly 1120, and the third lens assembly 1130 may include a lens and a barrel, and the barrel to which the lens is coupled may be coupled to an inner circumferential surface of each holder.

The camera module 1000 according to an embodiment may comprise: a base 1200; a first guide part 1210 disposed on one side of the base 1200; a second guide portion 1220 disposed on the other side of the base 1200; a first lens assembly 1110 corresponding to the first guide part 1210; a second lens assembly 1120 corresponding to the second guide part 1220.

The detailed configuration of the camera module 1000 to which the principles of the present invention can be applied has been described above. Hereinafter, a method for the camera module 1000 to perform OIS correction according to an embodiment will be described.

In using a camera, camera shake is generally caused by a user's hand shake. That is, camera shake may occur due to minute hand shake that occurs when a user takes a picture using a camera, and the camera shake appears in the form of vibration, causing the image reaching the image sensor to be inaccurate.

Therefore, in order to solve this problem, the optical correction method is most commonly used.

In the case of the prism method, if a difference in the optical path of the incident light occurs due to camera shake, the amount of change in the optical path is measured, and based on the measured value, the light path is corrected using a liquid-type prism that exists between the refractive prism and the lens.

Specifically, looking at the principle of operation, an incident light incident on the lens barrel passes through the incident surface of the refractive prism, and the incident light passed therethrough is reflected by the total reflection surface of the refractive prism may be arrived at the image sensor through the light exiting surface.

However, when camera shake occurs in this process, the amount of movement of the image due to camera shake is calculated based on the amount of angular velocity in the two-axis direction of the camera, and then the amount of optical path change can be measured based on this. And, the path of the incident light can be corrected by using a prism existing between the refractive prism and the lens based on the measured optical path change.

Specifically, a method of correction using a prism will be described with reference to FIG. 16.

Figure 16:
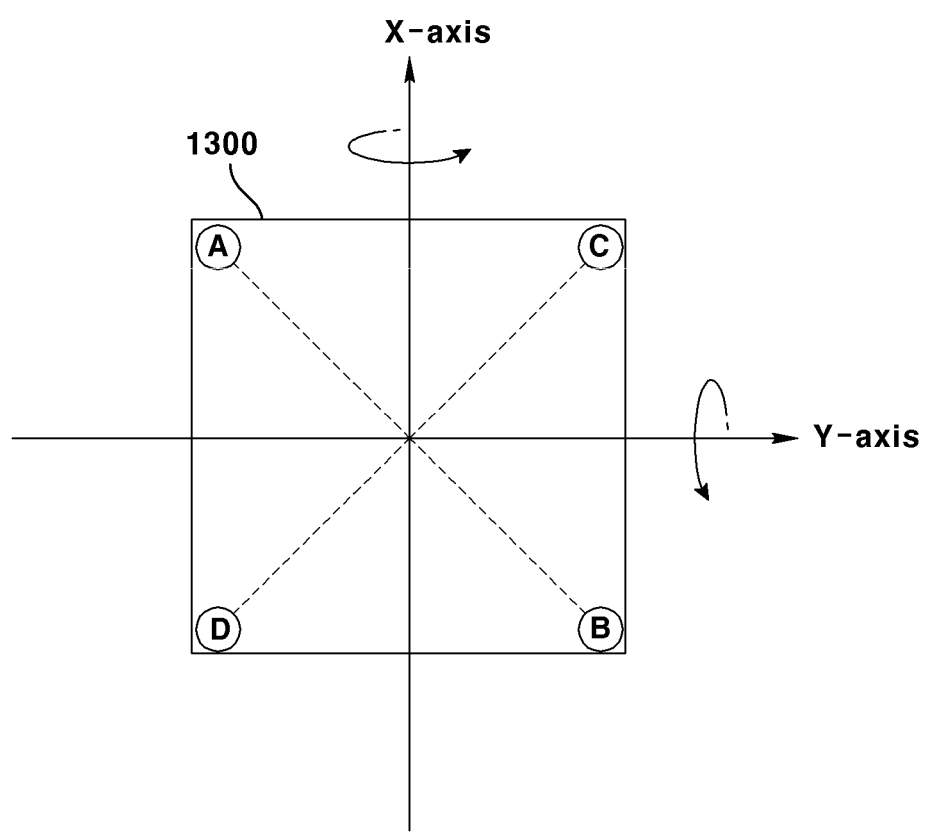
FIG. 16 is a view for explaining a method in which a prism according to the prior art performs OIS correction.

FIG. 16 is a view for explaining a method in which a prism according to the prior art performs OIS correction.

In general, when the optical path difference occurs due to camera shake, the amount of angular velocity in the two-axis direction (X-axis and Y-axis direction) of the camera is calculated through the sensor mounted on the camera, and the amount of movement of the image due to the camera shake is calculated. After that, OIS correction is performed in the X-axis and Y-axis directions by rotating the prism based on this.

However, in the case of the prior art, as illustrated in FIG. 16, since the correction was performed by rotating the prism 130 based on the diagonal of the prism 130, both the X-axis and Y-axis had to move. Accordingly, there was a problem in that crosstalk occurs in which the X-axis correction and the Y-axis correction influence each other.

That is, since the correction on the X-axis and the Y-axis has to be performed simultaneously with one prism 130, the prism cannot be rotated with respect to the X-axis or the Y-axis, and as illustrated in FIG. 16, the correction had to be performed by rotating the prism based on the diagonal line (line A-B or line C-D).

In this case, since the prism is rotated around the diagonal, even if only the X-axis correction is attempted, it inevitably affects the Y-axis, and conversely, there was a problem of inevitably affecting the X-axis even when only the Y-axis was to be corrected.

Therefore, the camera module 1000 according to an embodiment is an invention designed to solve this problem, and is to provide a camera module 1000 that can perform OIS correction more accurately by separately disposing the prism performing X-axis OIS correction and the OIS prism performing Y-axis correction so that correction for one axis does not affect the other axis. Hereinafter, it will be described in more detail through the drawings.

Figure 17:
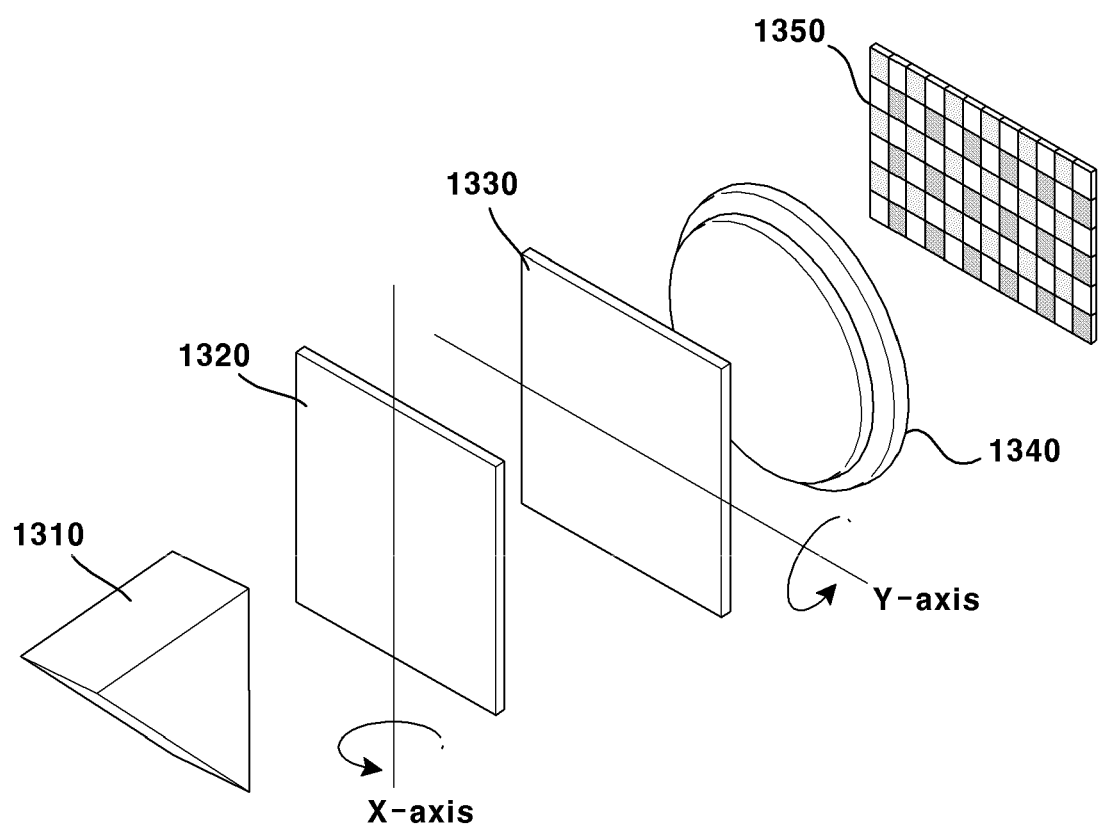
FIG. 17 is an exploded perspective view illustrating some components of the camera module according to a first embodiment of the present invention.
Figure 18:
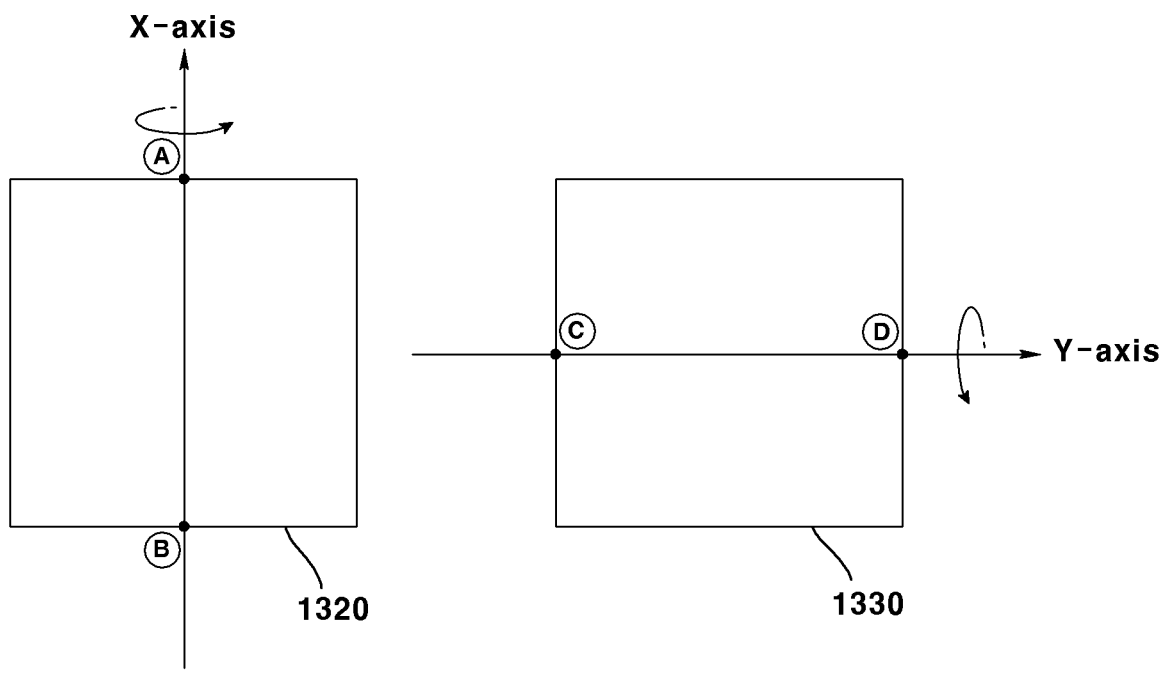
FIG. 18 is a diagram illustrating a method of performing OIS correction for a plurality of prisms on separate axes, respectively, according to an embodiment of the present invention.

FIG. 17 is an exploded perspective view illustrating some components of the camera module 1000 according to a first embodiment, and FIG. 18 is a diagram illustrating a method of performing OIS correction on separate axes by a plurality of prisms 1320 and 330, respectively, according to an embodiment.

Referring to FIG. 17, the camera module 1000 according to an embodiment may comprise: a refraction prism 1310 for changing the path of the incident light from the outside; a plurality of correction prisms 1320 and 330 for performing OIS correction in a manner that changes the path of light passing through the refractive prism 1310; a lens 1340 for receiving light passing through a plurality of correction prisms 1320 and 330; an image sensor 1350 that converts light entering through the lens 1340 into an electrical digital signal; and the like In addition, although not illustrated in FIG. 17, the camera module 1000 may include a plurality of sensors capable of measuring the moving direction of the camera module 1000 and the amount of change thereof. Specifically, it may include a gyro sensor capable of measuring the angular velocity of the camera module 1000 or a Hall sensor capable of measuring the direction and magnitude of magnetic force emitted from a magnet mounted inside the camera module 1000.

Therefore, the control unit 1370 of the camera module 1000 detects the movement and movement direction of the camera module 1000 based on the results obtained through these sensors, and individually controls the correction prisms 1320 and 330 based on this. In this way, OIS correction can be performed.

In addition, although it is illustrated to have one lens 1340 in FIG. 17 for convenience of description, is not limited thereto, and the number of lenses may be varied depending on the purpose of manufacture. In particular, in the case of a zoom lens, as described in FIG. 3, a total of three lenses may be included due to its characteristics.

Looking at the operating principle of the camera module 1000 according to an embodiment, the incident light incident on the lens barrel passes through the incident surface of the refractive prism 1310, and the incident light passed therethrough is reflected on the total reflection surface of the refractive prism 1310 and may be incident on the prisms 1320 and 330 that perform OIS correction through the light exiting surface.

Specifically, the prism may be divided into a first prism 1320 for performing X-axis correction for OIS correction and a second prism 1330 for performing Y-axis correction, and the light that has passed through the refractive prism 1310 may have a change in the light path while passing through each of the prisms 1320 and 330.

The plurality of correction prisms 1320 and 330 may be configured as liquid prisms so that an optical path can be easily changed.

Looking specifically at how the light path is changed, as illustrated in FIG. 18, the X-axis correction is performed in a way that the first prism 1320 is rotated based on the center line A-B of the first prism 1320, and the Y-axis correction may be performed in a way that the second prism 1330 is rotated based on the center line C-D of the second prism.

That is, in the case of the prior art that performs X-axis and Y-axis correction using one prism, since the correction was performed by rotating the prism based on the diagonal of the prism, correction for one axis had no choice but to affect the other axis.

However, in the case of the camera module 1000 according to an embodiment, unlike the prior art, since the X-axis and Y-axis correction is independently performed using separate prisms 1320 and 330, the correction for each axis does not affect the other axes, so there is an effect that can perform OIS correction more accurately.

In addition, in FIG. 17, for convenience of explanation, it was described based on a total of two prisms that are the first prism 1320 for performing the X-axis correction and the second prism 1330 for performing the Y-axis correction, but is not limited thereto, and the prisms may be disposed in various numbers and in various positions depending on the purpose of manufacture.

In addition, it is not limited in a way that the first prism 1320 performs the X-axis correction, and the second prism 1330 performs the Y-axis correction, but instead, the first prism 1320 may perform Y-axis correction, and the second prism 1330 may perform X-axis correction.

Figure 19:
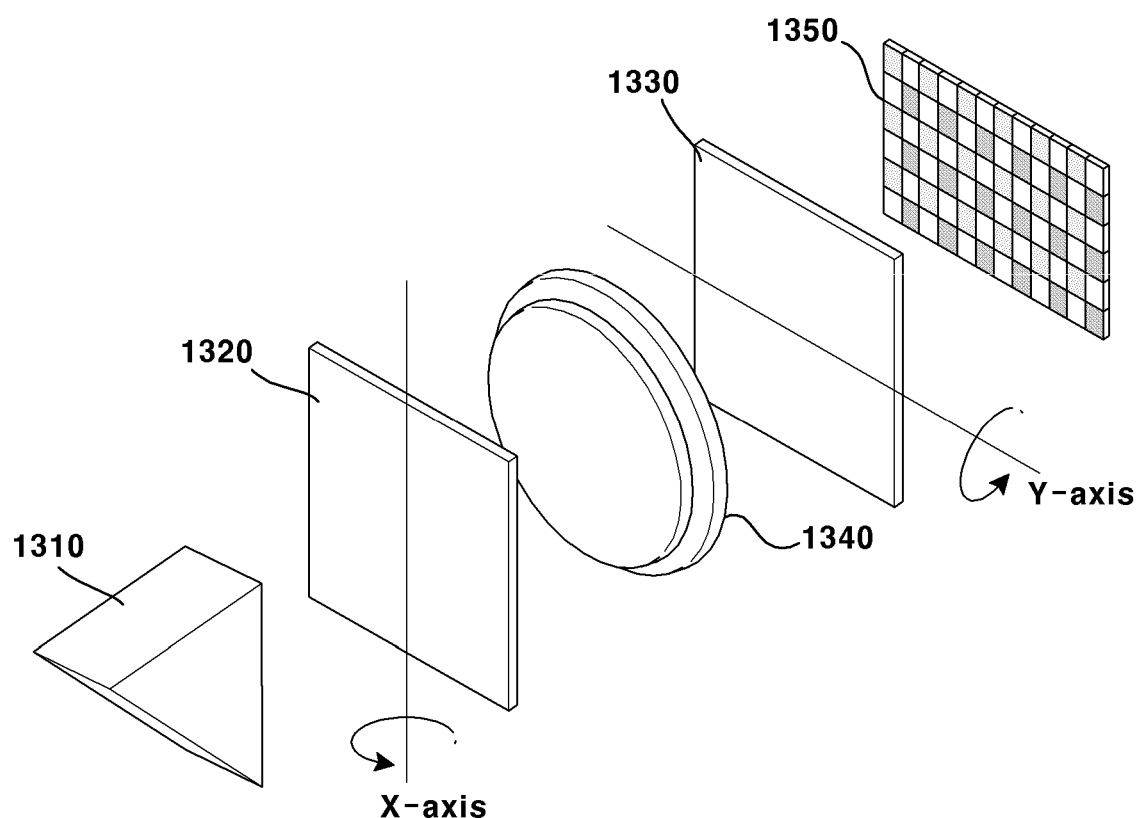
FIG. 19 is an exploded perspective view illustrating some components of a camera module according to another type of a first embodiment of the present invention.
Figure 20:
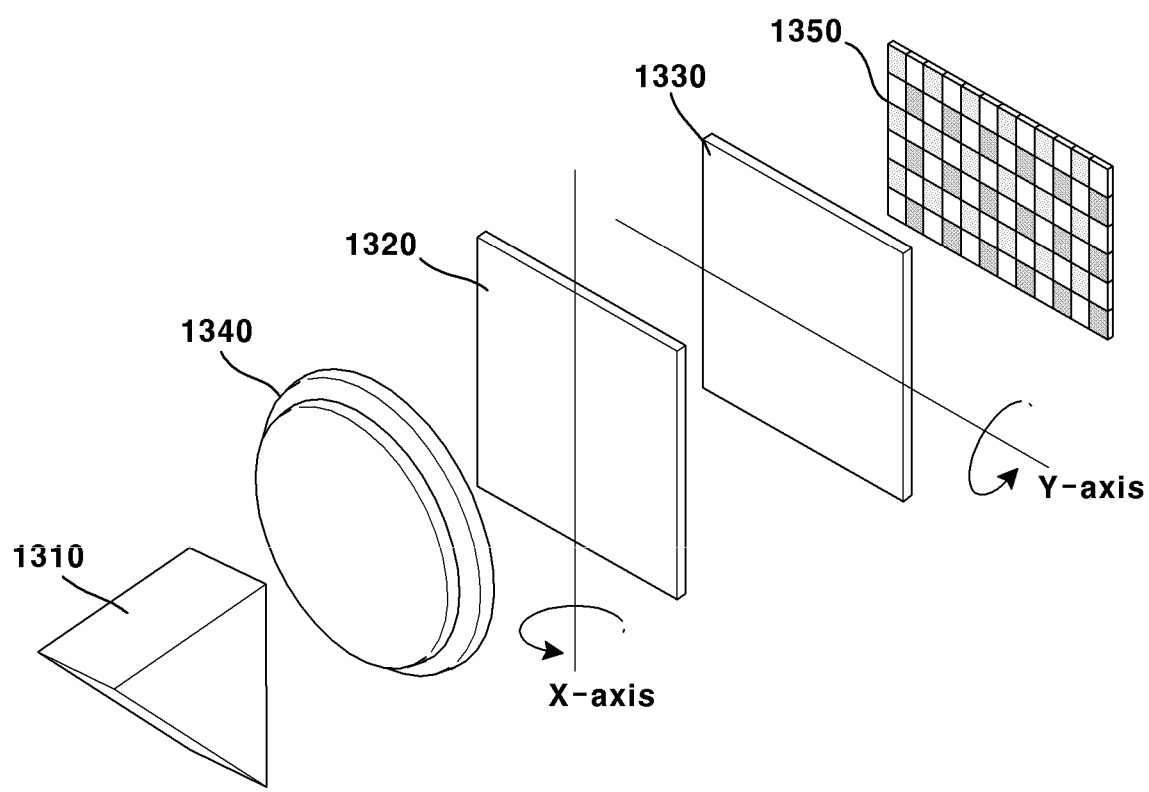
FIG. 20 is an exploded perspective view illustrating some components of a camera module according to still another type of a first embodiment of the present invention.

FIGS. 19 and 20 are exploded perspective views illustrating some components of a camera module according to another type of a first embodiment.

Referring to FIGS. 19 and 20, the components disposed in FIGS. 19 and 20 are the same as the components described with reference to FIG. 17, but the arrangement position of each component is different from FIG. 17.

In the case of FIG. 19, the lens 1340 illustrates an example that may be disposed between the first prism 1320 for performing X-axis correction and the second prism 1330 for performing Y-axis correction, and in the case of FIG. 20, an example in which the lens 1340 may be disposed in front of the first prism 1320 for performing X-axis correction and the second prism 1330 for performing Y-axis correction is illustrated.

Of course, in FIGS. 19 and 20, it is not limited in a way that the first prism 1320 performs X-axis correction, and the second prism 1330 performs Y-axis correction, but instead, the first prism 1320 performs Y-axis correction, and the second prism 1330 may perform X-axis correction.

Figure 21:
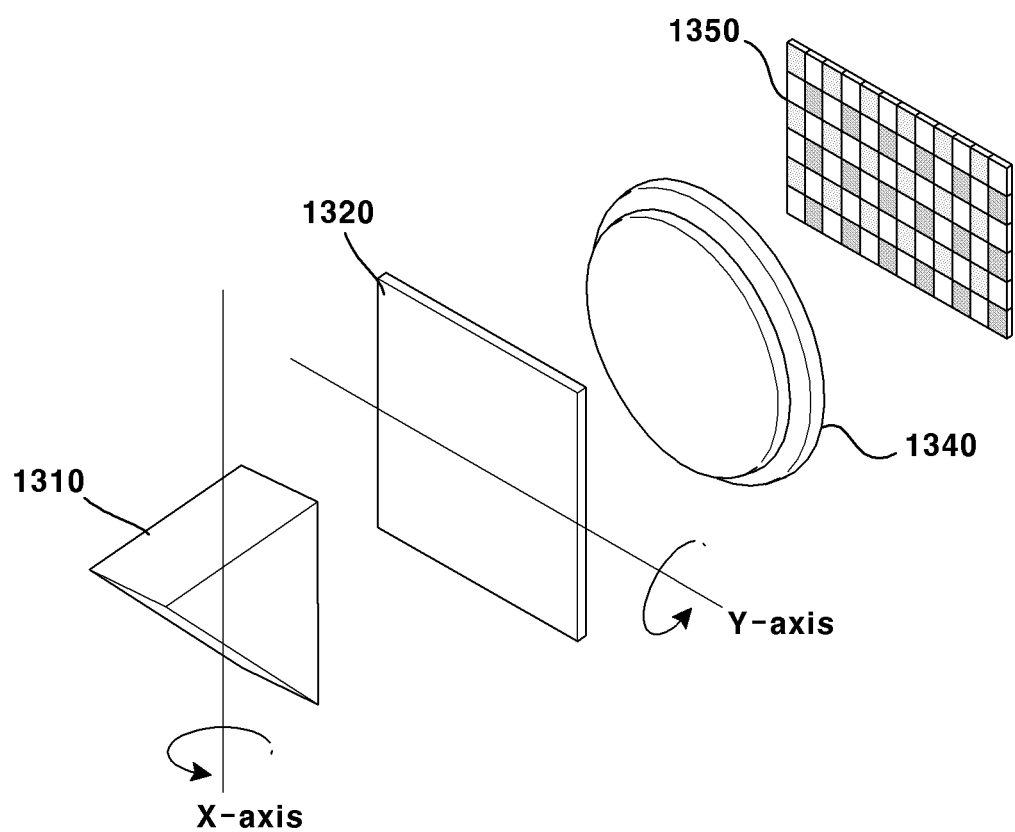
FIG. 21 is an exploded perspective view illustrating some components of a camera module according to a second embodiment of the present invention.
Figure 22:
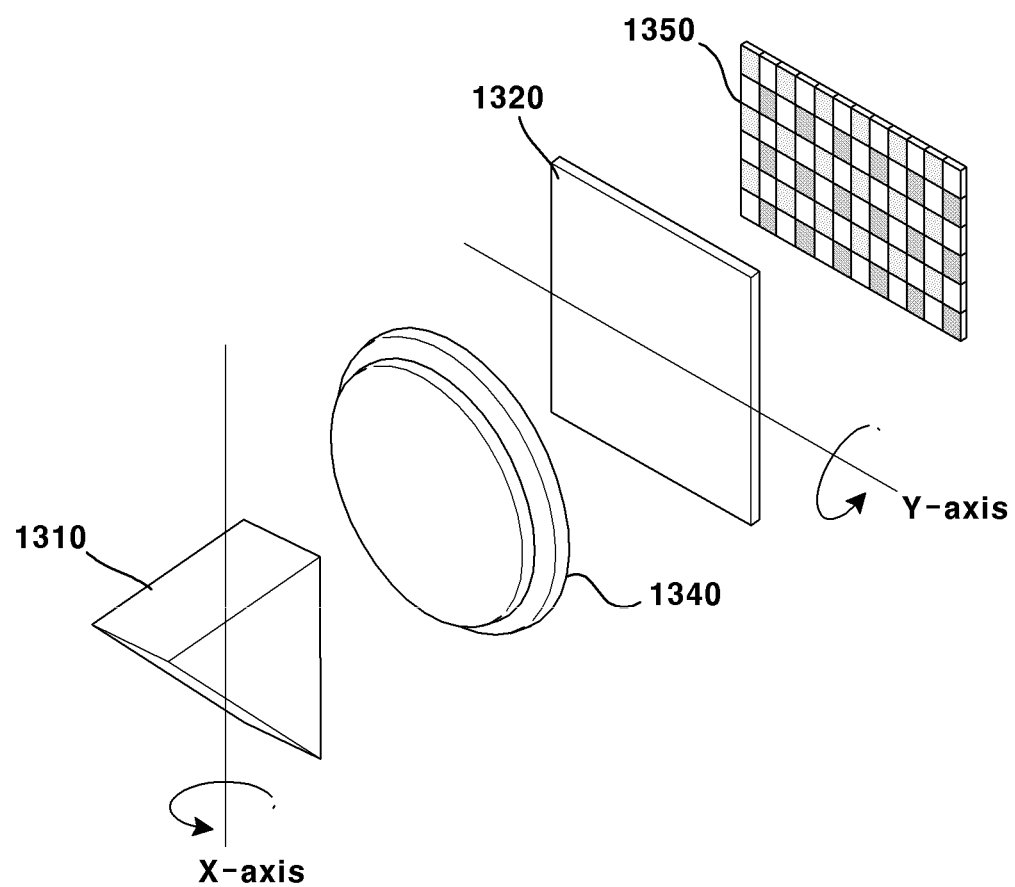
FIG. 22 is an exploded perspective view illustrating some components of a camera module according to another type of a second embodiment of the present invention.

FIGS. 21 and 22 are exploded perspective views illustrating some components of the camera module 1000 according to a second embodiment.

Referring to FIGS. 21 and 22, the camera module 1000 according to an embodiment may comprise: a refractive prism 1310 that performs OIS correction while changing the path of light incident from the outside; a correction prism 1320 that performs OIS correction in a way that changes the path of light that has passed through the refractive prism 1310; a lens 1340; an image sensor 1350 that converts light into an electrical digital signal; and the like.

The components illustrated in FIGS. 21 and 22 are mostly the same as the components described with reference to FIG. 17. However, in the case of a second embodiment, the refractive prism 1310 not only plays the role of changing the path of light through the role of total reflection, but may also perform OIS correction at the same time.

Specifically, the refractive prism 1310 may perform correction on the X-axis based on the correction amount calculated through the sensor, and the correction prism 1320 may perform correction on the Y-axis. In this case, in addition, since the refractive prism 1310 and the correction prism 1320 perform the correction on the X-axis and the Y-axis independently, the correction for each axis does not affect the other axis, so there is an effect that OIS correction can be performed more accurately.

In addition, positions at which respective components are disposed in FIGS. 21 and 22 may be variously modified according to manufacturing purposes. That is, as illustrated in FIG. 9, the correction prism 1320 may be disposed between the refractive prism 1310 and the lens 1340, and as illustrated in FIG. 22, the lens 1340 may be disposed between the correction prism 1320 and the image sensor 1350.

Figure 23:
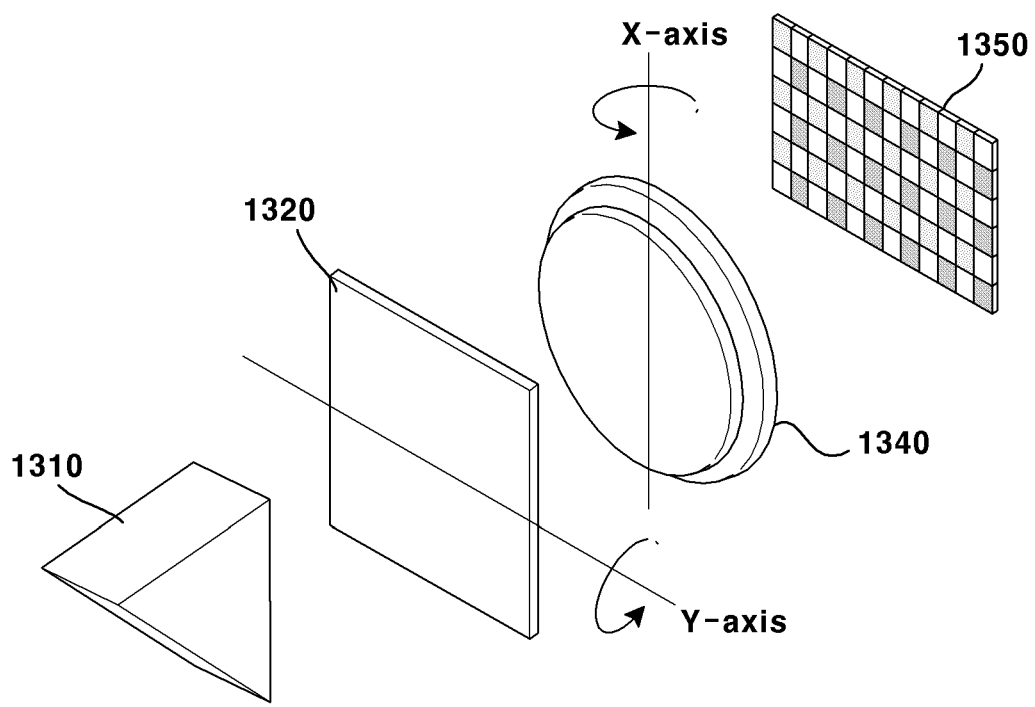
FIG. 23 is an exploded perspective view illustrating some components of a camera module according to a third embodiment of the present invention.
Figure 24:
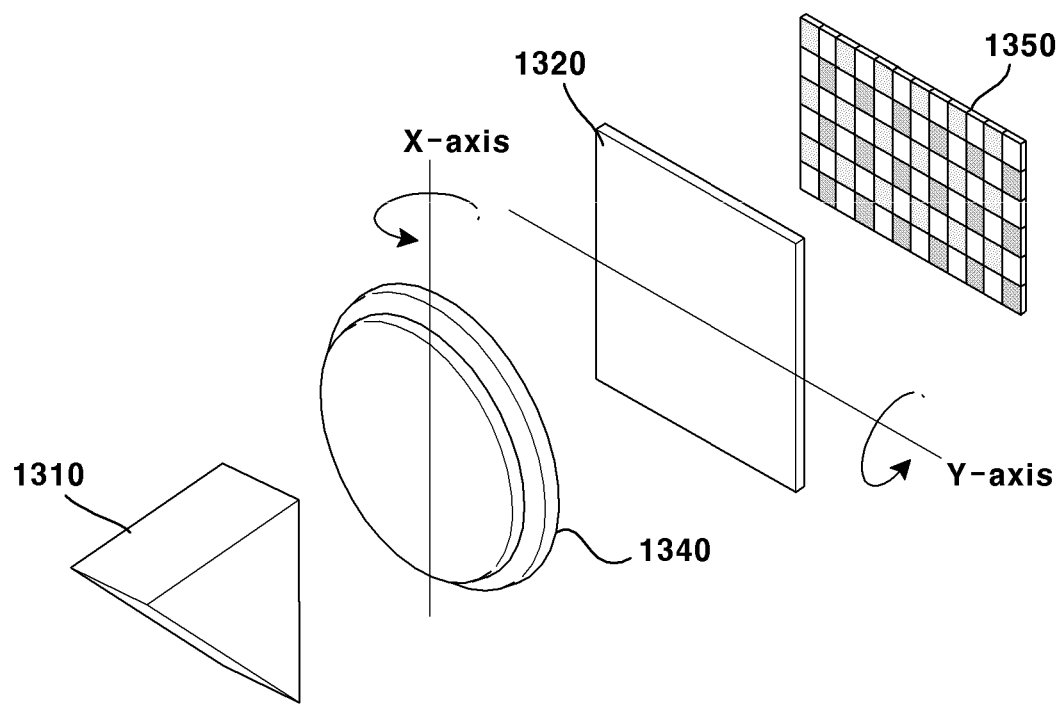
FIG. 24 is an exploded perspective view illustrating some components of a camera module according to another type of a third embodiment of the present invention.

FIGS. 23 and 24 are exploded perspective views illustrating some components of the camera module 1000 according to a third embodiment.

Referring to FIGS. 23 and 24, the camera module 1000 according to an embodiment may comprise: a refraction prism 1310 for changing the path of the incident light from the outside; a correction prism 1320 for performing OIS correction in a way that changes the path of light that has passed through the refractive prism 1310; a lens 1340; an image sensor 1350 for converting light entering through the lens 1340 into an electrical digital signal; and the like.

The components illustrated in FIGS. 23 and 24 are also mostly the same as the components described with reference to FIG. 17. However, in the case of a third embodiment, the lens 1340 plays the role of receiving light and at the same time may perform OIS correction for changing the path of the light. That is, in the third embodiment, since the lens 1340 includes a liquid-type lens, the control unit 1370 may change the path of light passing through the lens 1340 using an electrical signal.

Specifically, the refractive prism 1320 performs correction for the X-axis with respect to the correction amount calculated through the sensor, and the lens 1340 may perform correction for the Y-axis. In this case, since each of the refractive prism 1320 and the lens 1340 independently performs corrections for the X-axis and the Y-axis, correction for each axis does not affect other axis, so there is an effect in that OIS correction can be performed more accurately.

In addition, positions at which each of the components in FIGS. 23 and 24 are disposed may be variously disposed according to the purpose of manufacturing. That is, as illustrated in FIG. 21, the correction prism 1320 may be disposed between the refractive prism 1310 and the lens 1340, and as illustrated in FIG. 24, the correction prism 1320 may be disposed between the lens 1340 and the image sensor 1350.

FIG. 23 is a block diagram illustrating some components of the camera module 1000 according to an embodiment.

Figure 25:
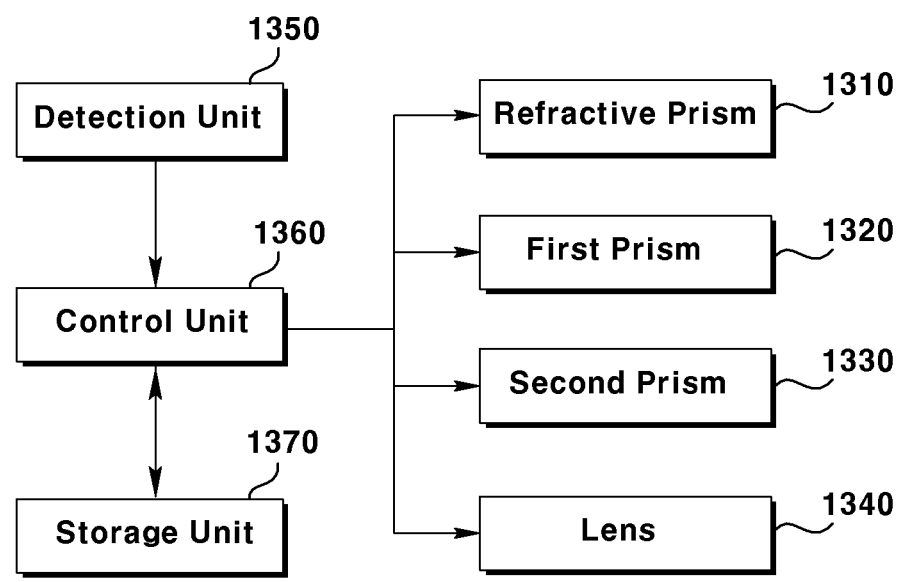
FIG. 25 is a block diagram illustrating some components of a camera module according to an embodiment of the present invention.

Referring to FIG. 25, a camera module 1000 according to an embodiment may comprise: a detection unit 1360 for detecting the movement direction and amount of change of the camera module 1000; a control unit 1370 for performing OIS correction, based on the result detected by the sensing unit 1360, by controlling at least one of a refractive prism 1310, a first prism 1320, a second prism 1330, and the lenses 1340; a storage unit 1380 in which various information about the camera module 1000 is stored; and the like.

The sensing unit 1360 may comprise: a plurality of sensors capable of measuring the movement direction of the camera module 1000 and the amount of change thereof; a gyro sensor capable of specifically measuring the angular velocity of the camera module 1000; a Hall sensor that can measure the direction and magnitude of magnetic force emitted from a magnet mounted inside the camera module 1000; and the like.

Based on the result received through the control unit 1370 and the sensing unit 1360, OIS correction can be performed in a manner of controlling at least one of the refractive prism 1310, the first prism 1320, the second prism 1330, and the lens 1340. The method of performing the OIS correction has been described in detail in the previous drawings, so it will be omitted.

In addition, in FIG. 25, the camera module 1000 is illustrated as including all of the refractive prism 1310, the first prism 1320, the second prism 1330, and the lens 1340, but is not limited to this configuration, as described previously, some components may be omitted according to various embodiments, and the number of prisms is also not limited to the first prism 1320 and the second prism 1330, and may include various numbers depending on the purpose of manufacture.

In addition, the control unit 1370 may control various devices provided in the camera module 1000 including an actuator (not shown). Specifically, the control unit 1370 may control the direction, intensity, and amplitude of a current applied to a coil capable of moving the lens. The control unit 1370 may perform AF driving, OIS driving, AF feedback control, and/or OIS feedback control of the camera module.

The storage unit 1380 may store information about various devices provided in the camera module 1000 including the refractive prism 1310, the first prism 1320, the second prism 1330, and actuator 700 for lens 1340. Accordingly, the control unit 1370 may control various devices of the camera module 1000 based on the information stored in the storage unit 1380 and the results detected by the detection unit 1360.

Accordingly, the storage unit 1380 may be implemented as at least one of non-volatile memory devices such as a cache, a read only memory (ROM), a programmable ROM (PROM), an erasable programmable ROM (EPROM), an electrically erasable programmable ROM (EEPROM), and a flash memory, or a volatile memory device such as random access memory (RAM) or a hard disk drive (HDD), and a CD-ROM, but is not limited thereto.

In addition, the storage unit 1380 may be a memory implemented as a separate chip in relation to the aforementioned control unit 1370, or may be implemented as a single chip with the control unit 1370.

Figure 26:
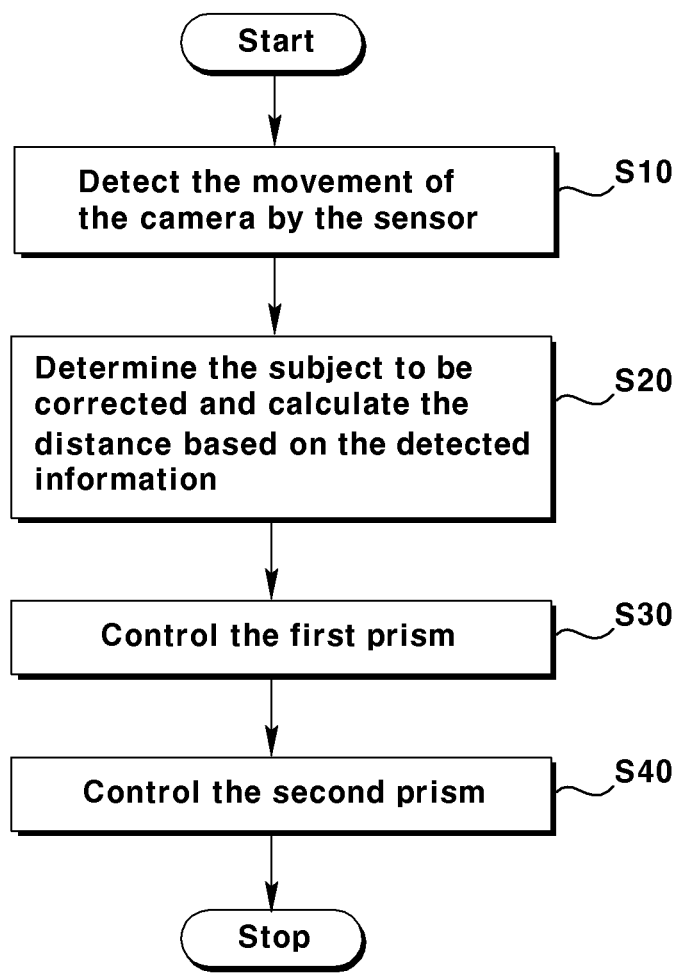
FIG. 26 is a sequential diagram illustrating a procedure according to a method for controlling a camera module according to an embodiment of the present invention.

FIG. 26 is a sequential diagram illustrating a procedure according to a method for controlling a camera module 1000 according to an embodiment of the present invention.

Referring to FIG. 26, the camera module 1000 may detect the movement of the camera module 1000 through various sensors mounted on the camera module 1000. (S10)

Specifically, the direction and degree of movement of the camera module 1000 may be measured through a gyro sensor or a Hall sensor.

Thereafter, the camera module 1000 may calculate subject for performing OIS correction and a correction amount based on the detected information. (S20)

Specifically, the necessary correction amount for the X-axis and the necessary correction amount for the Y-axis of the camera module 1000 may be individually calculated.

Thereafter, based on the calculated result, the OIS correction may be performed by individually controlling the first prism 1320 and the second prism 1330. (S30, S40)

In FIG. 26, the first prism 1320 and the second prism 1330 are illustrated to be controlled, but it is not limited thereto, and the refractive prism 1310 and the lens 1340 may be controlled according to an embodiment.

Up to now, various embodiments of the camera module 1000 and a method of controlling the camera module 1000 have been studied through the drawings.

In the case of the prism method in the OIS correction method of the prior art, since there is only one prism for changing the path of light, both the X-axis and the Y-axis has to be performed at the same time, so there is a problem in that the accuracy is lowered. That is, since the path was changed using one prism, there was a problem in that even if only one axis was to be corrected, the other axis was affected.

Therefore, the present invention is an invention devised to solve the problems of the prior art as described above, and is to provide a camera module that can perform OIS correction more accurately by separately disposing the prism performing X-axis OIS correction and the OIS prism performing Y-axis correction so that correction for one axis does not affect the other axis.

In the case of the camera module 1000 according to an embodiment, in performing OIS correction, prisms for performing OIS correction for each axis are independently disposed, so that there is an effect of more accurately performing OIS correction.

In addition, in the case of the camera module 1000 according to an embodiment, by performing OIS correction on one axis using a refractive prism or a lens capable of OIS correction, and performing OIS correction on the other axis with a correction prism, so that there is an effect of more accurately performing OIS correction.

The modified embodiment according to the present embodiment may include some configurations of the embodiment described with reference to FIGS. 1 to 12 and some configurations of the embodiment described with reference to FIGS. 13 to 26 together. That is, the modified embodiment includes the embodiment described with reference to FIGS. 1 to 12, but some configurations of the embodiment described with reference to FIGS. 1 to 12 are omitted, but instead, some configurations of the embodiment described with reference to the corresponding FIGS. 13 to 26 may be included. Alternatively, in the modified embodiment, some configurations of the embodiment described with reference to FIGS. 13 to 26 are omitted, but instead, some configurations of the embodiments described with reference to corresponding FIGS. 1 to 12 may be included.

Features, structures, effects, and the like described in the above embodiments are included in at least one embodiment, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the embodiments.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A shaper unit comprising:
a shaper body formed of a transparent material;
a first glass disposed on one side of the shaper body;
a membrane disposed on one side of the first glass;
a variable prism disposed on one side of the membrane; and
a second glass disposed on one side of the variable prism;
wherein the shaper body comprises a metal part having an opening formed therein, a light transmitting part spaced apart from and disposed on one side of the metal part, and a protruding part protruding to the light transmitting part from a region adjacent to the opening in a lower surface of the metal part,
wherein a lower surface of the protruding part is in contact with an edge region of an upper surface of the light transmitting part, and
wherein the opening and the light transmitting part overlap the first glass in a direction of an optical axis.

2. The shaper unit according to claim 1, wherein a size of the shaper body is larger than a size of the first glass in a vertical direction to the optical axis.

3. The shaper unit according to claim 2, wherein a region not overlapping the first glass in a direction of the optical axis in an upper surface or a lower surface of the shaper body is laminated with a non-transmissive material.

4. The shaper unit according to claim 1, wherein the variable prism comprises a container and a liquid disposed inside the container.

5. The shaper unit according to claim 4, wherein a size of the liquid is larger than a size of the first glass in a vertical direction to the optical axis.

6. The shaper unit according to claim 4, wherein a size of the membrane is larger than a size of the liquid in a vertical direction to the optical axis.

7. An image stabilization device comprising:
a shaper body formed of a transparent material;
a first glass disposed on one side of the shaper body;
a membrane disposed on one side of the first glass;
a variable prism disposed on one side of the membrane;
a second glass disposed on one side of the variable prism;
a first driving part disposed on the shaper body; and
a second driving part facing the first driving part,
wherein the shaper body comprises a metal part having an opening formed therein, and a light transmitting part disposed on one side of the metal part,
wherein a lower surface of the metal part is in contact with an edge region of an upper surface of the light transmitting part, and
wherein the opening and the light transmitting part overlap the first glass in a direction of an optical axis.

8. The image stabilization device according to claim 7, wherein a size of the shaper body is larger than a size of the first glass in a vertical direction to the optical axis.

9. The image stabilization device according to claim 7, wherein a region not overlapping the first glass in a direction of the optical axis in an upper surface or a lower surface of the shaper body is laminated with a non-transmissive material.

10. The image stabilization device according to claim 7, wherein the shaper body comprises a protruding part protruding to one side from a region adjacent to the opening in the lower surface of the metal part, and
wherein a lower surface of the protruding part is in contact with the edge region of an upper surface of the light transmitting part.

11. The image stabilization device according to claim 7, wherein the variable prism comprises a container and a liquid disposed inside the container.

12. The image stabilization device according to claim 11, wherein a size of the liquid is larger than a size of the first glass in a vertical direction to the optical axis.

13. The image stabilization device according to claim 11, wherein a size of the membrane is larger than a size of the liquid in a vertical direction to the optical axis.

14. The image stabilization device according to claim 7, one of the first driving part and the second driving part comprises a magnet, and the other one of the first driving part and the second driving part comprises a coil.

15. The image stabilization device according to claim 7, wherein the first driving part is disposed in an edge region of the shaper body.

16. The image stabilization device according to claim 7, wherein the first driving part is disposed on a side surface of the shaper body.

* * * * *